(12) United States Patent
Kobayashi

(10) Patent No.: US 7,681,550 B2
(45) Date of Patent: Mar. 23, 2010

(54) INTERNAL COMBUSTION ENGINE

(75) Inventor: Tatsuo Kobayashi, Susoso (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 108 days.

(21) Appl. No.: 11/884,674

(22) PCT Filed: Feb. 22, 2006

(86) PCT No.: PCT/JP2006/303814

§ 371 (c)(1),
(2), (4) Date: Apr. 8, 2008

(87) PCT Pub. No.: WO2006/090884

PCT Pub. Date: Aug. 31, 2006

(65) Prior Publication Data

US 2008/0275621 A1    Nov. 6, 2008

(30) Foreign Application Priority Data

Feb. 24, 2005    (JP) .............................. 2005-048514

(51) Int. Cl.
*F02B 3/00* (2006.01)
*F02B 1/00* (2006.01)

(52) U.S. Cl. ..................... 123/299; 123/429; 123/304; 123/681

(58) Field of Classification Search ................. 123/299, 123/429, 430, 431, 434, 436, 681, 687, 525, 123/526, 304, 305, 27 R
See application file for complete search history.

(56) References Cited

U.S. PATENT DOCUMENTS

| 6,530,361 | B1 | 3/2003 | Shiraishi et al. | |
| 6,675,748 | B2 * | 1/2004 | Ancimer et al. | 123/27 R |
| 6,796,118 | B2 * | 9/2004 | Kitahara | 60/285 |
| 2001/0045201 | A1 | 11/2001 | Yoshizawa et al. | |
| 2002/0053336 | A1 | 5/2002 | Nogi et al. | |
| 2002/0166515 | A1 * | 11/2002 | Ancimer et al. | 123/27 R |
| 2004/0016227 | A1 * | 1/2004 | Kitahara | 60/285 |
| 2004/0118116 | A1 * | 6/2004 | Beck et al. | 60/601 |
| 2004/0118557 | A1 * | 6/2004 | Ancimer et al. | 166/227 |
| 2005/0072402 | A1 * | 4/2005 | Zurloye et al. | 123/304 |

FOREIGN PATENT DOCUMENTS

DE    100 32 232 A1    2/2001

(Continued)

*Primary Examiner*—John T Kwon
(74) *Attorney, Agent, or Firm*—Kenyon & Kenyon LLP

(57) ABSTRACT

An internal combustion engine 10 includes a fuel injection valve 37 for injecting a gasoline fuel into a combustion chamber 25, and a spark plug 35. When the internal combustion engine is operated in a light-load region, the fuel is injected at an early and/or middle stage of an intake strode, whereby a homogeneous air/fuel mixture is formed and compressed to thereby perform a premixed-charge compression auto-ignition operation in which the fuel is auto-ignited and combusted. When the internal combustion engine is operated in a middle-load region, a spark-ignition combustion operation is performed. When the internal combustion engine is operated in a high-load region, air taken into the combustion chamber is compressed, and the fuel is injected into the compressed air, thereby performing a diffusion combustion operation in which the fuel is diffusion-combusted.

17 Claims, 15 Drawing Sheets

FOREIGN PATENT DOCUMENTS

| | | |
|---|---|---|
| DE | 601 06 325 T2 | 2/2005 |
| EP | 1 063 427 A2 | 12/2000 |
| EP | 1 156 199 A2 | 11/2001 |
| JP | 49-085407 A | 8/1974 |
| JP | 8-004535 A | 1/1996 |
| JP | 2000-64863 A | 2/2000 |
| JP | 2000-320333 A | 11/2000 |
| JP | 2001-003800 A | 1/2001 |
| JP | 2001-020765 A | 1/2001 |
| JP | 2001-073905 A | 3/2001 |
| JP | 2001-207850 A | 8/2001 |
| JP | 2001-323828 A | 11/2001 |
| JP | 2002-188468 A | 7/2002 |
| JP | 2002-242715 A | 8/2002 |
| JP | 2002-242730 A | 8/2002 |
| JP | 2002-285844 A | 10/2002 |
| JP | 2003-232256 A | 8/2003 |
| JP | 2004-003439 | 1/2004 |
| JP | 2004-11539 A | 1/2004 |
| JP | 2004-28022 A | 1/2004 |
| JP | 2004-044498 A | 2/2004 |
| JP | 2004-132304 A | 4/2004 |
| JP | 2004-245126 A | 9/2004 |
| JP | 2004-245171 A | 9/2004 |

* cited by examiner (A)

(B)

(C)

(D)

(E)

(F)

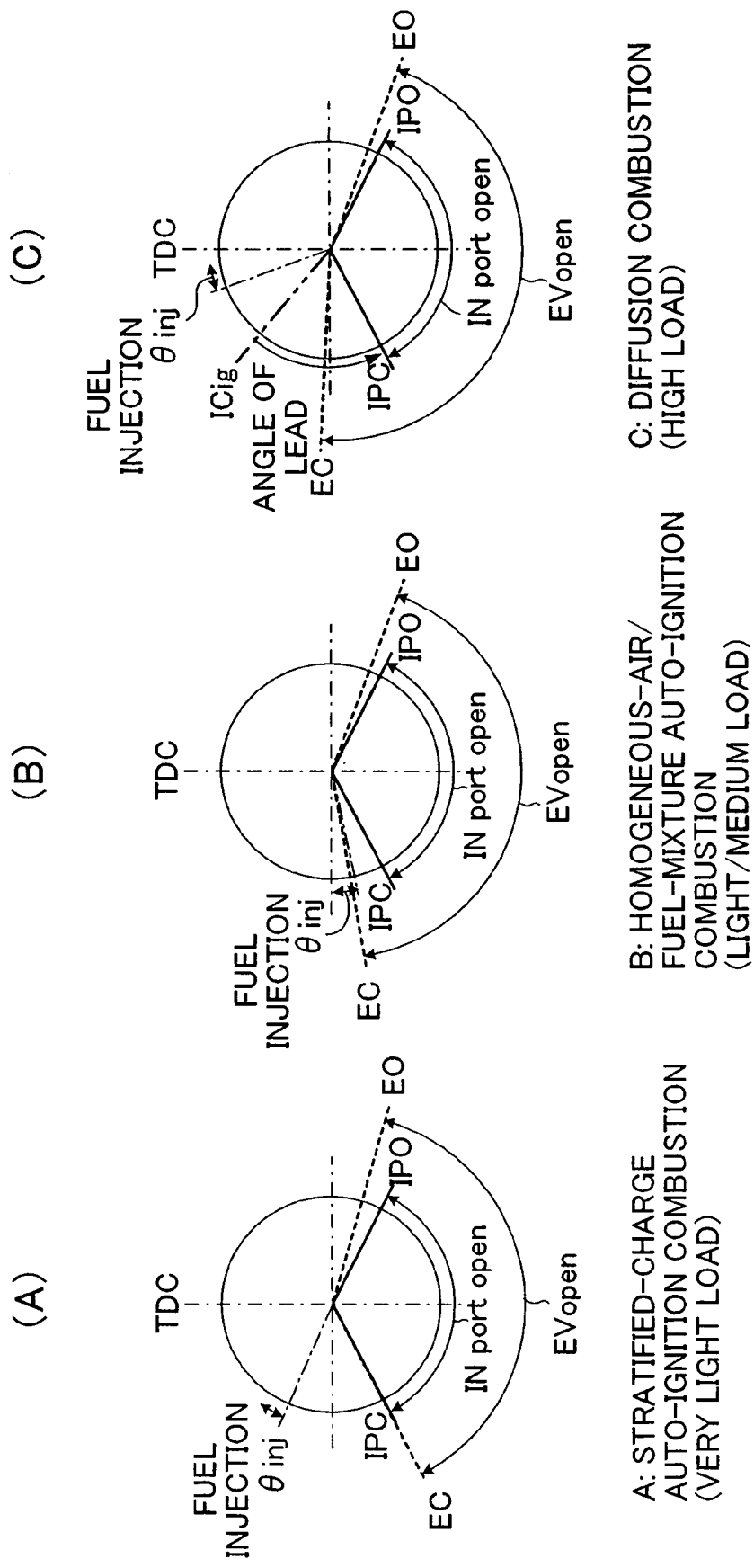

INTERNAL COMBUSTION ENGINE

This is a 371 national phase application of PCT/JP2006/303814 filed 22 Feb. 2006, claiming priority to Japanese Patent Application No. 2005-048514 filed 24 Feb. 2005, the contents of which are incorporated herein by reference.

TECHNICAL FIELD

The present invention relates to an internal combustion engine in which a mixture of air and gasoline fuel formed in a combustion chamber can be auto-ignited through compression.

BACKGROUND ART

It is known that the amount of $NO_x$ produced from an internal combustion engine which combusts (burns) gasoline as a fuel depends on a combustion period of time during which the temperature in a combustion chamber is high temperature, and becomes smaller as the combustion period of time shortens. In premixed-charge compression auto-ignition (self-ignition) combustion in which an air/fuel mixture formed in the combustion chamber is compressed at high compression ratio to thereby be ignited, the compressed air/fuel mixture is ignited substantially simultaneously at a large number of scattered positions. Accordingly, auto-ignition combustion completes within a shorter period of time than spark ignition combustion in which fuel is combusted through propagation of flame. Thus, an internal combustion engine that carries out auto-ignition combustion can reduce $NO_x$ emissions as compared with an internal combustion engine that carries out spark ignition combustion. Furthermore, auto-ignition combustion enables combustion at high compression ratio and at very lean air/fuel ratio, so that the fuel efficiency is improved.

Since auto-ignition combustion completes within a very short period of time, auto-ignition combustion in a high-load region, which requires a large amount of fuel, causes an abrupt increase in pressure (cylinder pressure) within the combustion chamber, and therefore, very loud combustion noise may be caused. In order to cope with the noise problem, there has been developed a 4-cycle internal combustion engine which performs an auto-ignition combustion operation in a light-load region where the auto-ignition combustion causes low noise; and which performs a spark ignition combustion operation in which an air/fuel mixture is ignited by a spark generated by a spark plug, in a high-load region where loud combustion noise is generated by the auto-ignition combustion (refer to, for example, Japanese Patent Application Laid-Open (kokai) No. 2000-64863, claim 1 and FIG. 4).

Meanwhile, a compression ratio of an internal combustion engine designed to carry out the auto-ignition combustion is considerably higher than a compression ratio of an internal combustion engine designed to carry out the spark ignition combustion. Accordingly, if the internal combustion engine which can perform auto-ignition combustion performs spark ignition combustion when the load is high, knocking arises. In this connection, the conventional internal combustion engine, in order to lower actual compression ratio, delays timing of closing of an intake valve until near the top dead center of a compression stroke in a spark ignition operation, so that knocking can be avoided.

However, since operation in a high-load region requires combustion of a large amount of fuel, there is a limit imposed on the extent of delaying timing of closing of an intake valve. This is because excessively delaying timing of closing of an intake valve causes a reduction in the amount of an air/fuel mixture (i.e., amount of fuel). Thus, the conventional internal combustion engine can not avoid knocking sufficiently and can not increase torque which the engine generates.

DISCLOSURE OF THE INVENTION

An object of the present invention is to provide an internal combustion engine which can generate high torque without knocking and excessive noise, while reducing an amount of $NO_x$ and improving fuel efficiency through execution of an auto-ignition combustion operation.

An internal combustion engine of the present invention which achieves the above object comprises:

fuel injection means for injecting a gasoline fuel into a combustion chamber which is defined by a top surface of a piston, a bore wall surface of a cylinder, and a bottom surface of a cylinder head of the internal combustion engine; and premixed-charge compression auto-ignition combustion operation execution means for, when the internal combustion engine is operated in a light-load region, premixing air taken into (or in) the combustion chamber and the fuel injected into the combustion chamber from the fuel injection means, and forming and compressing a homogeneous air/fuel mixture having uniform spatial distribution of the fuel to thereby initiate auto-ignition combustion of the fuel.

The internal combustion engine further comprises diffusion combustion operation execution means for, when the internal combustion engine is operated in a high-load region in which load is greater than in the light-load region, compressing air taken into the combustion chamber within the combustion chamber and injecting the fuel into the compressed air from the fuel injection means to thereby initiate diffusion combustion of the fuel in place of the auto-ignition combustion of the fuel.

When the thus-configured internal combustion engine is operated in the light-load region, the homogeneous air/fuel mixture having uniform spatial distribution of the fuel is formed and compressed, so that an operation is performed through homogeneous-charge compression auto-ignition combustion in which the fuel is auto-ignited. Thus, the internal combustion engine can reduce emissions of $NO_x$. Meanwhile, when the internal combustion engine is operated in the high-load region in which load is greater than in the light-load region, the fuel is injected into the compressed air, so that an operation through diffusion combustion is performed. Since an operation through diffusion combustion exhibits lower likelihood of occurrence of knocking than an operation through spark-ignition combustion, the operation through diffusion combustion does not require lowering actual (substantial) compression ratio by unduly delaying timing of closing of the intake valve. Therefore, when the internal combustion engine is operated in the high-load region, stable combustion can be realized under the high compression ratio, so that high torque can be generated. Furthermore, since gasoline vaporizes more readily than does diesel oil, speed of the diffusion combustion is high. Thus, the internal combustion engine can generate greater output in a high-engine-speed region.

The internal combustion engine can be configured so as to perform a 4-cycle operation in which, every 720 degrees of crank angle, an intake stroke, a compression stroke, a combustion stroke, and an exhaust stroke are repeated, and the engine can comprise:

swirl-generating means for generating an intake air swirl within the combustion chamber through intake of the air into the combustion chamber;

spark-generating means for generating an ignition spark within the combustion chamber; and spark-ignition combustion operation execution means for, when the internal combustion engine is operated in a middle-load (medium-load) region in which load is greater than in the light-load region and smaller than in the high-load region, premixing air taken into the combustion chamber and the fuel injected into the combustion chamber from the fuel injection means, forming and compressing a homogeneous air/fuel mixture having uniform spatial distribution of the fuel, and igniting the compressed homogeneous air/fuel mixture by means of an ignition spark generated by the spark-generating means to thereby initiate spark-ignition combustion of the fuel.

The thus-configured internal combustion engine performs an operation through auto-ignition combustion in the light-load region, an operation through spark-ignition combustion in a middle-load region, and an operation through diffusion combustion in a high-load region. Thus, even if the internal combustion engine is an engine which makes excessively loud noise when operated through auto-ignition combustion in the middle-load region and which can not stably carry out diffusion combustion in the middle-load region, the above configuration enables the internal combustion engine to stably carry out spark-ignition combustion without making excessively loud noise in the middle-load region.

Furthermore, in the above configuration, the premixed-charge compression auto-ignition combustion operation execution means can be configured:

(1) so as to open an intake valve at an intake valve opening timing for light load, the opening timing varying based on the load of the internal combustion engine, and so as to close the intake valve at an intake valve closing timing for light load, the closing timing varying based on the load of the internal combustion, and (2) so as to inject the fuel from the fuel injection means at a timing within an early stage and/or a middle stage of an intake stroke, at which a swirl of air taken into the combustion chamber is the strongest, the timing being between the intake valve opening timing for light load and the intake valve closing timing for light load, to thereby form the homogeneous air/fuel mixture.

According to this configuration, a strong swirl of intake air mixes air in the whole combustion chamber and the injected fuel, thereby reliably forming the homogeneous air/fuel mixture having uniform (homogeneous) spatial distribution of the fuel. As a result, $NO_x$ emissions can be reduced, and thermal efficiency (fuel economy) can be improved.

The spark-ignition combustion operation execution means can be configured:

(1) so as to open the intake valve at an intake valve opening timing for middle-load (e.g., timing in advance of the intake valve opening timing for light load), the opening timing varying based on the load of the internal combustion engine, and so as to close the intake valve at an intake valve closing timing for middle-load, the closing timing varying based on the load of the internal combustion and lagging (behind, or being the retarded timing from) the intake valve closing timing for light load, and (2) so as to inject the fuel from the fuel injection means at a timing within an early stage and/or a middle stage of an intake stroke, at which a swirl of air taken into the combustion chamber is the strongest, the timing being between the intake valve opening timing for middle-load and the intake valve closing timing for middle-load, to thereby form the homogeneous air/fuel mixture.

According to this configuration, timing of closing of the intake valve is set to lag the intake valve closing timing for light load to thereby lower (or decrease) actual (or substantial) compression ratio, and a stirring action of an intake air swirl is utilized for forming the homogeneous air/fuel mixture having uniform spatial distribution of the fuel. Thus, occurrence of knocking can be avoided, and a stable spark-ignition combustion operation can be performed.

Furthermore, the diffusion combustion operation execution means can be configured:

(1) so as to open the intake valve at an intake valve opening timing for high load, the opening timing varying based on the load of the internal combustion engine, and so as to close the intake valve at an intake valve closing timing for high load, the closing timing varying based on the load of the internal combustion and leading (or in advance of) the intake valve closing timing for middle-load, and (2) so as to inject the fuel from the fuel injection means at a timing lagging the intake valve closing timing for high load and near a compression top-dead-center.

According to this configuration, since timing of closing of the intake valve is set to lead the intake valve closing timing for middle-load in a spark-ignition combustion operation, actual compression ratio does not drop (or lowers, decreases) greatly. Also, the fuel undergoes diffusion combustion. As a result, stable combustion can be carried out at high compression ratio, so that torque which is generated by the internal combustion engine can be enhanced (or increased).

In this case, preferably, the piston has a cavity formed at a central portion of the top surface of the piston, and the fuel injection means is configured so as to inject the fuel toward the cavity.

Furthermore, preferably, the internal combustion engine further comprises stratified-charge auto-ignition combustion operation execution means for, when the internal combustion engine is operated in a very-light-load region in which load is smaller than in the light-load region, opening the intake valve at an intake valve opening timing for very light load, the opening timing varying based on the load of the internal combustion engine; closing the intake valve at an intake valve closing timing for very light load, the closing timing varying based on the load of the internal combustion engine; injecting the fuel from the fuel injection means at an injection timing within a middle stage of a compression stroke, which injection timing lags the intake valve closing timing for very light load and is before the compression top-dead-center to thereby substantially stagnate the injected fuel in the cavity, and compressing the homogeneous air/fuel mixture being formed within the cavity to thereby initiate auto-ignition combustion of the fuel.

According to the above configuration, even in a very-light-load operation in which the amount of fuel is small, an air/fuel mixture having sufficiently high concentration for auto-ignition can be reliably formed within the cavity, so that stable auto-ignition combustion can be carried out. As a result, an operation region in which an auto-ignition operation can be performed is expanded to cover a region of lighter load, so that $NO_x$ emissions can be reduced more, and fuel economy can further be improved.

Furthermore, preferably, the internal combustion engine further comprises:

cylinder pressure detection means for detecting cylinder pressure, which is pressure within the combustion chamber; and operation changeover means for, during an auto-ignition combustion operation is being executed by the premixed-charge compression auto-ignition combustion operation execution means, obtaining a cylinder pressure average by averaging cylinder pressures which are detected by the cylinder pressure detection means in a period ranging from start of a compression stroke to end of the combustion stroke associated with (or for) a single combustion, and obtaining an average cylinder-pressure-average by averaging cylinder pressure averages associated with (or for) a plurality of past combustions and for, when an absolute value of a difference between a cylinder pressure average associated with a current combustion and the average cylinder-pressure-average is greater than (or in excess of) a predetermined value, changing over operation so as to execute the auto-ignition combustion operation by the stratified-charge auto-ignition combustion operation execution means.

According to this configuration, a determination of whether or not auto-ignition combustion by the premixed-charge compression auto-ignition combustion operation execution means is unstable is made by determining whether or not a value $\Delta P$ derived from an absolute value of the difference ($|Pi-Piave|$) between "a cylinder pressure average $Pi$ associated with a current combustion" and "an average cylinder-pressure-average $Piave$, which is an average of cylinder pressure averages associated with a plurality of past combustions", is in excess of (or becomes greater than) a predetermined value. When it is determined that auto-ignition combustion by the premixed-charge compression auto-ignition combustion operation execution means becomes unstable based on the determination that the value $\Delta P$ derived from the absolute value of the difference is in excess of the predetermined value, operation is changed over from the auto-ignition combustion operation by the premixed-charge compression auto-ignition combustion operation execution means to an auto-ignition combustion operation by the stratified-charge auto-ignition combustion operation execution means. Therefore, a state where torque variations or the like occurs, caused by instability in operation of the internal combustion engine, can be avoided.

Preferably, the value $\Delta P$ derived from the absolute value of the difference is a quotient of the absolute value of the difference ($|Pi-Piave|$) divided by the average cylinder-pressure-average $Piave$.

Furthermore, preferably, the internal combustion engine comprises:

cylinder pressure detection means for detecting cylinder pressure which is pressure within the combustion chamber; and operation changeover means for, during an auto-ignition combustion operation is being executed by the pre mixed-charge compression auto-ignition combustion operation execution means, obtaining an amount of change in cylinder pressure per unit time or unit crank angle; i.e., a cylinder-pressure change rate, on the basis of the cylinder pressure detected by the cylinder pressure detection means and for, when the obtained cylinder-pressure change rate is in excess of a predetermined change rate, changing over operation so as to execute the spark-ignition combustion operation by the spark-ignition combustion operation execution means.

According to this configuration, a determination of whether or not noise associated with premixed-charge compression auto-ignition combustion of the homogeneous air/fuel mixture is excessive is made by determining whether or not the cylinder-pressure change rate is in excess of the predetermined change rate. When it is determined that the noise associated with the premixed-charge compression auto-ignition combustion of the homogeneous air/fuel mixture is excessive based on the determination that the cylinder-pressure change rate is in excess of the predetermined change rate, operation is changed over from the auto-ignition combustion operation by the premixed-charge compression auto-ignition combustion operation execution means to the spark-ignition combustion operation by the spark-ignition combustion operation execution means. Therefore, generation of excessive noise can be avoided.

Furthermore, preferably, the internal combustion engine further comprises:

knocking detection means for detecting knocking; and operation changeover means for, during a spark-ignition combustion operation is being executed by the spark-ignition combustion operation execution means, obtaining a frequency of occurrence of knocking on the basis of knockings detected by the knocking detection means and for, when the obtained frequency of occurrence of knocking is in excess of a predetermined frequency, changing over operation so as to execute the diffusion combustion operation by the diffusion combustion operation execution means.

According to this configuration, before the frequency of knocking becomes excessive, operation is changed over from the spark-ignition combustion operation by the spark-ignition combustion operation execution means to the diffusion combustion operation by the diffusion combustion operation execution means. This can avoid excessively frequent occurrence of knocking. The knocking detection means may detect occurrence of knocking on the basis of a change in cylinder pressure detected by a cylinder pressure sensor, or may detect knocking by use of a known knocking sensor which detects vibration of the internal combustion engine.

Furthermore, preferably, in the internal combustion engine having the above mentioned piston in which the cavity is formed on the top surface of the piston, the cavity has a closed-bottomed and generally cylindrical shape and is formed such that an edge portion serving as an inlet of the cavity has a diameter smaller than the maximum diameter of the interior of the cavity and such that a swirl guide groove for introducing the intake air swirl into the cavity is formed at an outer circumferential portion of the cavity.

According to this configuration; a swirl flow which is generated by the air taken into the combustion chamber and which flows along the bore wall surface of the cylinder can be efficiently introduced into the cavity by means of the swirl guide groove. This reduces the swirling radius of the intake air swirl, thereby intensifying the swirl flow.

As a result, during operation by the stratified-charge auto-ignition combustion operation execution means, an (homogeneous) air/fuel mixture can be readily formed substantially solely within the cavity, so that generation of $NO_x$ can be restrained. Also, during auto-ignition combustion of a homogeneous air/fuel mixture by the premixed-charge compression auto-ignition combustion operation execution means and during spark-ignition combustion of a homogeneous air/fuel mixture by the spark-ignition combustion operation execution means, an air/fuel mixture formed outside the cavity can be efficiently taken in the cavity, so that a homogeneous air/fuel mixture can be formed within the cavity through utilization of air in the whole combustion chamber. Therefore, generation of $NO_x$ can be restrained, and thermal efficiency (fuel economy) can be improved. Furthermore, during diffusion combustion by diffusion combustion operation execution means, a strong swirl flow generated within the cavity can facilitate mixing of fuel droplets and air (oxygen), so that air utilization rate during diffusion combustion can be enhanced. As a result, the thermal efficiency of the internal combustion engine can be made improved. Furthermore, since a large amount of oxygen can be present around each of fuel droplets, the generation of smoke can be restrained.

Preferably, the spark-generating means is a spark plug which is disposed such that a spark-generating portion thereof for generating the ignition spark is located at an inner circumferential portion of the cavity, and the internal combustion engine further comprises start/ cold-time stratified-charge spark-ignition combustion operation execution means for, when the internal combustion engine is started and/or in a cold condition, opening the intake valve at a predetermined intake valve opening timing for start/cold time, closing the intake valve at a predetermined intake valve closing timing for start/cold time, injecting the fuel from the fuel injection means at a timing within a latter stage of a compression stroke which lags the intake valve closing timing for start/cold time and is before the compression top-dead-center to thereby substantially stagnate the injected fuel in the cavity for forming a stratified air/fuel mixture within the cavity, and igniting the stratified air/fuel mixture by means of an ignition spark generated by the spark-generating means to thereby initiate spark-ignition combustion of the fuel.

When the internal combustion engine is started or is in a cold condition, the temperature of an air/fuel mixture is unlikely to rise. Thus, auto-ignition combustion is apt to become unstable. In order to cope with this problem, as in the above-mentioned configuration, the fuel is injected from the fuel injection means during the latter stage of the compression stroke which lags the intake valve closing timing for start/cold time and is before the compression top-dead-center, thereby substantially stagnating the fuel in the cavity and forming the stratified air/fuel mixture along an inner circumferential portion of the cavity by means of a swirl generated within the cavity. Then, the stratified air/fuel mixture is ignited by the spark plug whose spark-generating portion is located at the inner circumferential portion of the cavity. This improves the starting performance of the internal combustion engine or enables stable combustion in the cold condition.

Meanwhile, the internal combustion engine can be configured as follows:

the cavity has a closed-bottomed and generally cylindrical shape and is formed such that an edge portion serving as an inlet of the cavity has a diameter smaller than the maximum diameter of the interior of the cavity and such that a swirl guide groove for introducing the intake air swirl into the cavity is formed at an outer circumferential portion of the cavity, and the spark plug is disposed along the swirl guide groove.

According to this configuration, since the spark plug can be disposed in the swirl guide groove, the spark-generating portion of the spark plug can be readily disposed at an inner circumferential portion of the cavity.

Furthermore, preferably, a heat-insulating layer is formed on a wall surface of the cavity.

According to this configuration, since combustion gas remaining within the cavity is unlikely to be cooled, the temperature of an air/fuel mixture to be subjected to auto-ignition combustion can be kept high, so that auto-ignition combustion can be stably carried out. Furthermore, since vaporization of the fuel injected toward the cavity can be facilitated, the amount of smoke generated during diffusion combustion can be reduced.

Furthermore, preferably, the internal combustion engine of the present invention comprises a supercharger and is configured as follows:

each of the premixed-charge compression auto-ignition combustion operation execution means, the spark-ignition combustion operation execution means, and the diffusion combustion operation execution means is configured:

(1) so as to close an exhaust valve before the intake valve is opened, thereby generating a negative overlap period which is a period ranging from a timing of closing of the exhaust valve to a timing of opening of the intake valve; and (2) so as to control the timing of closing of the exhaust valve and the timing of opening of the intake valve in such a manner that, the negative overlap period shortens, as the load of the internal combustion engine increases.

Similarly, preferably, the internal combustion engine of the present invention further comprises a supercharger and is configured as follows:

each of the stratified-charge auto-ignition combustion operation execution means, the premixed-charge compression auto-ignition combustion operation execution means, the spark-ignition combustion operation execution means, and the diffusion combustion operation execution means is configured:

(1) so as to close the exhaust valve before the intake valve is opened, thereby generating a negative overlap period which is a period ranging from a timing of closing of the exhaust valve to a timing of opening of the intake valve; and (2) so as to control the timing of closing of the exhaust valve and the timing of opening of the intake valve in such a manner that, as load of the internal combustion engine increases, the negative overlap period shortens.

These configurations provide a so-called "negative overlap period (negative valve overlap period)" in which combustion gas is confined within the combustion chamber. In addition, the negative overlap period is varied in such a manner that, the greater a load of the internal combustion engine, the shorter the negative overlap period. Accordingly, when the internal combustion engine is operated at a load in the light-load region or lower, the amount of air to be introduced into the combustion chamber can be controlled by means of the negative overlap period. When the internal combustion engine is operated in a region in which load is greater than in the light-load region, the amount of air to be introduced into the combustion chamber can be controlled by means of supercharging by the supercharger and the negative overlap period. As a result, since a throttle valve disposed in an intake passage of the internal combustion engine can be generally held fully open, loss of energy associated with throttling by the throttle valve is reduced, so that fuel economy of the internal combustion engine can be improved.

Preferably, in the internal combustion engine, the fuel injection means is configured so as to inject the fuel in a first injection condition in which the fuel is injected at a narrow injection angle, or in a second injection condition in which the fuel is injected at the narrow injection angle and at a wide injection angle which is greater than the narrow injection angle;

the stratified-charge auto-ignition combustion operation execution means is configured so as to inject the fuel in the first injection condition from the fuel injection means; and each of the premixed-charge compression auto-ignition combustion operation execution means, the spark-ignition combustion operation execution means, and the diffusion combustion operation execution means is configured so as to inject the fuel in the second injection condition from the fuel injection means.

As mentioned previously, when an air/fuel mixture is subjected to auto-ignition combustion by the stratified-charge auto-ignition combustion operation execution means, the fuel is injected at the middle stage of the compression stroke. Accordingly, when the fuel is injected, a relatively large distance is present between the fuel injection means and the top surface of the piston on which the cavity is formed. Therefore, when the air/fuel mixture is subjected to auto-ignition combustion by the stratified-charge auto-ignition combustion operation execution means as in the case of the above-mentioned configuration, if the fuel is injected in a conical shape (the shape of a cone) having a narrow vertical angle, it is possible for the injected fuel to be reliably introduced into the cavity formed on the top surface of the piston. As a result, the amount of the fuel which is injected to the outside of the cavity and thus does not contribute to auto-ignition combustion can be reduced. Therefore, generation of unburnt HC can be restrained, and fuel economy can be improved.

Furthermore, according to the above-mentioned configuration, in the premixed-charge compression auto-ignition combustion operation and the spark-ignition combustion operation the fuel is injected, at a timing within the early stage and/or the middle stage of the intake stroke, at which the swirl of air becomes the strongest, in the conical shape (the shape of a cone) having the narrow vertical angle as well as in the conical shape (the shape of a cone) having the wide vertical angle. Accordingly, the injected fuel reaches the whole region of the combustion chamber and is stirred by the strong swirl flow of air within the combustion chamber. Thus, the whole air present within the combustion chamber is utilized for forming a homogeneous air/fuel mixture, so that $NO_x$ emissions can be reduced more, and thermal efficiency (fuel economy) can be improved.

In this case, preferably, the fuel injection means is a fuel injection valve having a group of narrow-angle injection holes which are opened for injection of the fuel when a needle of the fuel injection valve is in either condition of a low-lift condition and a high-lift condition, and a group of wide-angle injection holes which are opened for injection of the fuel only when the needle is in the high-lift condition;

the stratified-charge auto-ignition combustion operation execution means is configured so as to inject the fuel in the first injection condition by bringing the needle to the low-lift condition; and each of the premixed-charge compression auto-ignition combustion operation execution means, the spark-ignition combustion operation execution means, and the diffusion combustion operation execution means is configured so as to inject the fuel in the second injection condition by bringing the needle to the high-lift condition.

This enables the fuel to be injected in the above-mentioned injecting conditions corresponding to the operating conditions by means of a simple configuration. Also, since a dynamic range of fuel injection amount (difference between a minimum fuel injection amount and a maximum fuel injection amount) of the fuel injection valve can be readily increased, the fuel can be injected in a sufficient amount even at the time of high load.

Preferably, in the internal combustion engine having such a fuel injection valve, the fuel injection valve is formed such that the number of the wide-angle injection holes is greater than the number of the narrow-angle injection holes and such that the wide-angle injection holes are smaller in diameter than the narrow-angle injection holes.

In addition, preferably, the internal combustion engine further comprises fuel-injection-pressure-regulating means for increasing pressure of the fuel injected from the fuel injection valve as the load of the internal combustion engine increases.

This provides the following advantages:

(1) At the very light load (during operation by the stratified-charge auto-ignition combustion operation execution means), the fuel is injected from the narrow-angle injection holes each having a relatively large diameter, and the pressure of the fuel to be injected is relatively low. Thus, fuel droplets have a large droplet diameter. Therefore, the fuel can reliably reach the interior of the cavity.

(2) At a load from the light load to the middle-load (during operation by the premixed-charge compression auto-ignition combustion operation execution means or the spark-ignition combustion operation execution means), the fuel is injected not only from the narrow-angle injection holes but also from the wide-angle injection holes. As a result, air and the fuel within the combustion chamber are sufficiently mixed by fuel droplets each of which has the small droplet diameter and are injected at the wide angle as a result of injection from the wide-angle injection holes, as well as fuel droplets each of which has the large droplet diameter and are injected at the narrow angle as a result of injection from the narrow-angle injection holes. This enables the whole air present within the combustion chamber to be utilized to form a homogeneous air/fuel mixture, so that $NO_x$ emissions can be reduced more, and thermal efficiency (fuel economy) can be improved.

(3) At the time of high load (during diffusion combustion operation), the fuel is injected not only from the narrow-angle injection holes but also from the wide-angle injection holes. Also, the pressure of the fuel to be injected is relatively high. Accordingly, the droplet diameter of the fuel injected from the wide-angle injection holes becomes small. Thus, the fuel droplets injected from the wide-angle injection holes and air (oxygen) are sufficiently mixed. As a result, the thermal efficiency of the internal combustion engine can be improved. Furthermore, since a large amount of oxygen can be present around each of the fuel droplets, the generation of smoke can be effectively restrained.

Meanwhile, the internal combustion engine can be configured so as to perform a 2-cycle operation in which, every 360 degrees of crank angle, an exhaust stroke is started through establishment of communication between the combustion chamber and an exhaust port while communication is cut off between the combustion chamber and an intake port which is configured so as to generate an intake air swirl within the combustion chamber; next, a scavenging stroke is started through establishment of communication between the combustion chamber and the intake port; next, an intake stroke is started through cutoff of the communication between the combustion chamber and the exhaust port; next, a compression stroke is started through cutoff of the communication between the combustion chamber and the intake port; and subsequently, a combustion stroke is initiated.

In such a 2-cycle internal combustion engine, high-temperature combustion gas can be immediately utilized for raising the temperature of an air/fuel mixture to be subjected to next combustion, so that auto-ignition combustion can be stably carried out. Thus, an operation region in which an auto-ignition operation can be performed is expanded to cover a region of lighter load. Therefore, $NO_x$ emissions can be reduced more, and fuel economy can further be improved.

In this case, preferably, the internal combustion engine further comprises stratified-charge auto-ignition combustion operation execution means for, when the internal combustion engine is operated in a very-light-load region in which load is smaller than in the light-load region, injecting the fuel from the fuel injection means at a middle stage of the compression stroke to thereby substantially stagnate the injected fuel in the cavity and compressing the homogeneous air/fuel mixture being formed within the cavity to thereby initiate auto-ignition combustion of the fuel.

According to this configuration, even in a very-light-load operation in which the amount of fuel is small, an air/fuel mixture which has sufficiently high concentration for auto-ignition can be reliably formed within the cavity, so that stable auto-ignition combustion can be carried out. Therefore, an operation region in which an auto-ignition operation can be performed can be expanded to cover a region of lighter load, so that $NO_x$ emissions can be reduced more, and fuel economy can further be improved.

In this case, preferably, the premixed-charge compression auto-ignition combustion operation execution means is configured so as to inject the fuel from the fuel injection means at a timing when a swirl of air taken into the combustion chamber is the strongest during a period of time ranging from establishment of communication between the combustion chamber and the intake port to cutoff of the communication to form the homogeneous air/fuel mixture.

According to this configuration, the strong swirl of intake air mixes air in the whole combustion chamber and the injected fuel, and therefore, the homogeneous air/fuel mixture having uniform spatial distribution of the fuel is formed. As a result, $NO_x$ emissions can be reduced, and thermal efficiency (fuel economy) can be improved.

Furthermore, preferably, the diffusion combustion operation execution means is configured so as to inject the fuel from the fuel injection means at a timing near a top dead center during the compression stroke to thereby initiate diffusion combustion of the fuel and so as to cut off the communication between the combustion chamber and the intake port at a timing which leads (or is in advance) a timing of cutting off the communication between the combustion chamber and the intake port which (the timing) is set to avoid excessive occurrence of knocking under the assumption that the spark-ignition combustion is carried out in the high-load region in which the diffusion combustion operation is actually performed.

According to this configuration, since timing of cutoff of the communication between the combustion chamber and the intake port leads timing which, if spark-ignition combustion is carried out, is set for cutting off communication between the combustion chamber and the intake port for the purpose of avoiding excessive occurrence of knocking. Thus, actual compression ratio does not drop greatly. Also, the fuel is burned through diffusion combustion. As a result, stable combustion can be carried out at high compression ratio, so that torque generated by the internal combustion engine can be enhanced.

Another aspect of an internal combustion engine according to the present invention is configured so as to perform a 2-cycle operation in which, every 360 degrees of crank angle, an exhaust stroke is started through establishment of communication between the combustion chamber and an exhaust port while communication is cut off between the combustion chamber and an intake port which is configured so as to generate an intake air swirl within the combustion chamber; next, a scavenging stroke is started through establishment of communication between the combustion chamber and the intake port; next, a compression stroke is started through cutoff of the communication between the combustion chamber and the exhaust port and cutoff of the communication between the combustion chamber and the intake port; and subsequently, a combustion stroke is initiated.

The internal combustion engine further comprises stratified-charge auto-ignition combustion operation execution means for, when the internal combustion engine is operated in a very-light-load region in which load is smaller than in the light-load region, injecting the fuel from the fuel injection means at an injection timing for very light load during a middle stage of the compression stroke to thereby substantially stagnate the injected fuel in the cavity and compressing the homogeneous air/fuel mixture being formed within the cavity to thereby initiate auto-ignition combustion of the fuel; and a supercharger for compressing air which flows into the combustion chamber through the intake port.

In the internal combustion engine, the piston has a cavity formed at a central portion of the top surface of the piston;

the fuel injection means is a fuel injection valve disposed at a lower surface of the cylinder head and at a substantially central portion of a bore of the cylinder for injecting the fuel toward the cavity;

the exhaust port is configured such that one end of the exhaust port forms an opening portion at the lower surface of the cylinder head and around the fuel injection valve, such that opening the opening portion by an exhaust valve disposed at the opening portion establishes communication between the exhaust port and the combustion chamber, and such that closing the opening portion by the exhaust valve cuts off communication between the exhaust port and the combustion chamber; and the intake port is configured such that one end of the intake port forms an opening portion at a bore wall surface of the cylinder, such that opening the opening portion by a side wall of the piston during movement of the piston from a top dead center to a bottom dead center establishes communication between the intake port and the combustion chamber, and such that closing the opening portion by the side wall of the piston during movement of the piston from the bottom dead center to the top dead center cuts off communication between the intake port and the combustion chamber. That is, the internal combustion engine is a so-called "uniflow-type 2-cycle internal combustion engine."

In such a uniflow-type 2-cycle internal combustion engine, preferably, the premixed-charge compression auto-ignition combustion operation execution means is configured so as to inject the fuel at an injection timing for light load in advance of the injection timing for very light load to thereby form the homogeneous air/fuel mixture; and the diffusion combustion operation execution means is configured so as to inject the fuel from the fuel injection means at an injection timing for high load during the compression stroke, which injection timing lags the injection timing for very light load and is near the top dead center, to thereby initiate diffusion combustion of the fuel.

In such a uniflow-type 2-cycle internal combustion engine, high-temperature combustion gas can be immediately utilized for raising the temperature of an air/fuel mixture to be subjected to next combustion, so that auto-ignition combustion can be stably carried out. Thus, an operation region in which the auto-ignition operation can be performed can be expanded to cover a region of lighter load. As a result, $NO_x$ emissions from the internal combustion engine can be reduced more, and fuel economy can further be improved.

Here, in an ordinary internal combustion engine having an intake valve and an exhaust valve that are provided on a cylinder head, as load increases, timing of closing of the intake valve is delayed; as a result, an actual stroke volume (actual compression-stroke volume) drops. By contrast, the uniflow-type 2-cycle internal combustion engine does not involve such a drop in actual stroke volume and thus can maintain high actual compression ratio. As a result, the uniflow-type 2-cycle internal combustion engine can generate a large maximum torque.

Additionally, in a high-load region, through supercharging by the supercharger and execution of diffusion combustion, stable combustion without involvement of knocking can be maintained. As a result, the internal combustion engine can generate a large maximum torque.

BRIEF DESCRIPTION OF THE DRAWINGS

FIG. 21 is a series of diagrams showing timing of opening/closing of an exhaust valve, timing of opening/closing of the intake port, and fuel injection timing of the internal combustion engine shown in FIG. 16.

BEST MODE FOR CARRYING OUT THE INVENTION

First Embodiment

Figure 1:
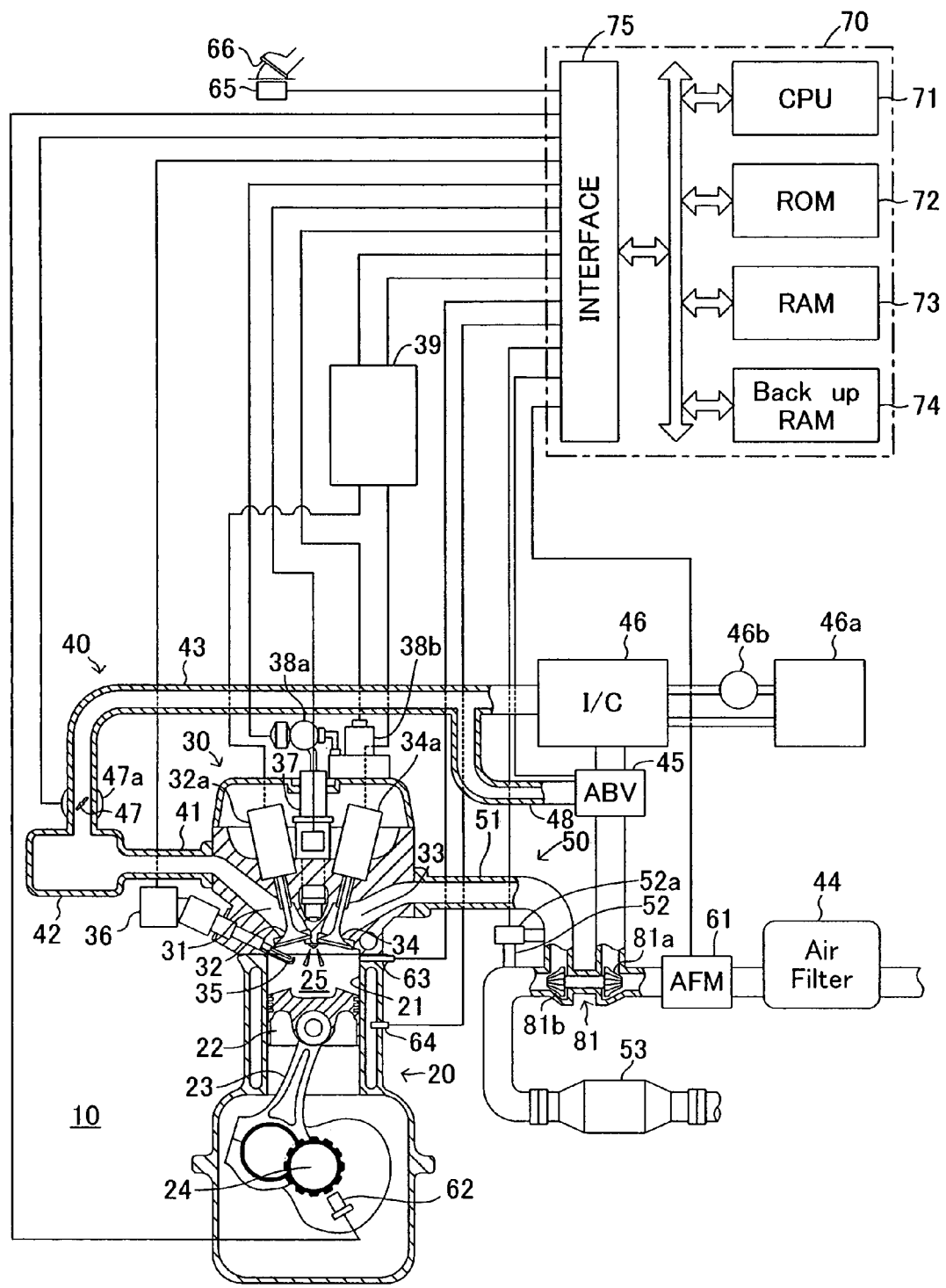
FIG. 1 is a schematic configurational view of an internal combustion engine according to a first embodiment of the present invention.

Embodiments of an internal combustion engine according to the present invention will next be described with reference to the drawings. FIG. 1 shows a schematic configuration of an internal combustion engine 10 according to a first embodiment of the present invention. FIG. 1 shows a section of a specific cylinder only, but other cylinders also have a similar configuration.

The internal combustion engine 10 is a piston-reciprocating-type 4-cycle internal combustion engine configured so as to perform a 4-cycle operation in which, every 720 degrees of crank angle, an intake stroke, a compression stroke, a combustion stroke, and an exhaust stroke are repeated. The internal combustion engine 10 uses gasoline as fuel.

The internal combustion engine 10 includes a cylinder block section 20 including a cylinder block, a cylinder block lower case, and an oil pan; a cylinder head section 30 fixed on the cylinder block section 20; an intake system 40 for supplying air to the cylinder block section 20; and an exhaust system 50 for discharging exhaust gas (combustion gas) from the cylinder block section 20 to the exterior of the engine.

The cylinder block section 20 includes a hollow, cylindrical cylinder 21, a piston 22, a connecting rod 23, and a crankshaft 24. The piston 22 reciprocates within the cylinder 21. The reciprocating motion of the piston 22 is transmitted to the crankshaft 24 via the connecting rod 23, thereby rotating the crankshaft 24. The bore wall surface of the cylinder 21, the top surface (piston head) of the piston 22, and the bottom surface of a cylinder head section 30 form a combustion chamber 25.

The cylinder head section 30 includes intake ports 31 connected to the combustion chamber 25; intake valves 32 for opening/closing the respective intake ports 31; intake-valve drive mechanisms 32a, which serve as intake-valve drive means for driving the respective intake valves 32; exhaust ports 33 connected to the combustion chamber 25; exhaust valves 34 for opening and closing the respective exhaust ports 33; exhaust-valve drive mechanisms 34a, which serve as exhaust-valve drive means for driving the exhaust valves 34; a spark plug 35; an igniter 36 including an ignition coil and adapted to generate high voltage to be applied to the spark plug 35; a fuel injection valve (fuel injection means) 37 for directly injecting fuel into the combustion chamber 25; a fuel-pressure-regulating means 38a including a fuel-pressure-accumulating chamber; and a fuel pump 38b. The intake-valve drive mechanisms 32a and the exhaust-valve drive mechanisms 34a are connected to a drive circuit 39.

Each of the intake ports 31 is a known swirl port (or a helical port) and is configured such that air, which flows into the combustion chamber 25 via the intake port 31 and the periphery of the corresponding intake valve 32, forms an intake air swirl (lateral swirl) within the combustion chamber 25 along the bore wall surface of the cylinder 21. That is, the intake ports 31 constitute swirl-generating means.

The spark plug 35 and the igniter 36 constitute spark-generating means for generating an ignition spark within the combustion chamber 25.

The fuel-pressure-regulating means 38a supplies the fuel injection valve 37 with high-pressure fuel whose pressure increases as load on (of) the internal combustion 10 increases. The fuel pump 38b transfers fuel under pressure to the fuel-pressure-regulating means 38a from an unillustrated fuel tank.

The intake system 40 includes an intake pipe 41 including an intake manifold, communicating with the intake ports 31, and forming an intake passage together with the intake ports 31; a surge tank 42 communicating with the intake pipe 41; an intake duct 43 whose one end is connected to the surge tank 42; and an air filter 44, a compressor 81a of a turbocharger 81, a bypass-flow-regulating valve (ABV) 45, an intercooler 46, and a throttle valve 47 which are sequentially disposed in the intake duct 43 from the other end portion of the intake duct 43 toward a downstream side (intake pipe 41).

The intake system 40 further includes a bypass passage 48. One end of the bypass passage 48 is connected to the bypass-flow-regulating valve 45, and the other end of the bypass passage 48 is connected to the intake duct 43 at a position between the intercooler 46 and the throttle valve 47. The bypass-flow-regulating valve 45 changes the opening of an unillustrated valve in response to a drive signal, thereby regulating an air flow which flows into the intercooler 46, and an air flow which bypasses the intercooler 46 (an air flow which flows into the bypass passage 48).

The intercooler 46 is of a water-cooled type and is adapted to cool air which flows through the intake duct 43. The intercooler 46 is connected to a radiator 46a which transfers heat from cooling water in the intercooler 46 to the atmosphere. The intercooler 46 is connected to a circulation pump 46b which circulates cooling water between the intercooler 46 and the radiator 46a.

The throttle valve 47 is rotatably supported in the intake duct 43 and is driven by a throttle valve actuator 47a, thereby varying the cross-sectional area of the opening of an intake passage.

The exhaust system 50 includes an exhaust pipe 51 including an exhaust manifold, communicating with the exhaust ports 33, and forming an exhaust passage together with the exhaust ports 33; a turbine 81b of the turbocharger (supercharger or supercharging means) 81 disposed in the exhaust pipe 51; a waste gate passage 52 whose opposite ends are connected to the exhaust pipe 51 upstream and downstream of the turbine 81b so as to bypass the turbine 81b; a supercharge-pressure-regulating valve 52a disposed in the waste gate passage 52; and a 3-way catalytic converter 53 disposed in the exhaust pipe 51 downstream of the turbine 81b.

The turbine 81b of the turbocharger 81 is rotated by energy of exhaust gas, thereby rotating the compressor 81a of the intake system 40 for compressing air. As a result, the turbocharger 81 compresses air in the intake passage and thereby supercharges the combustion chamber 25.

Figure 2:
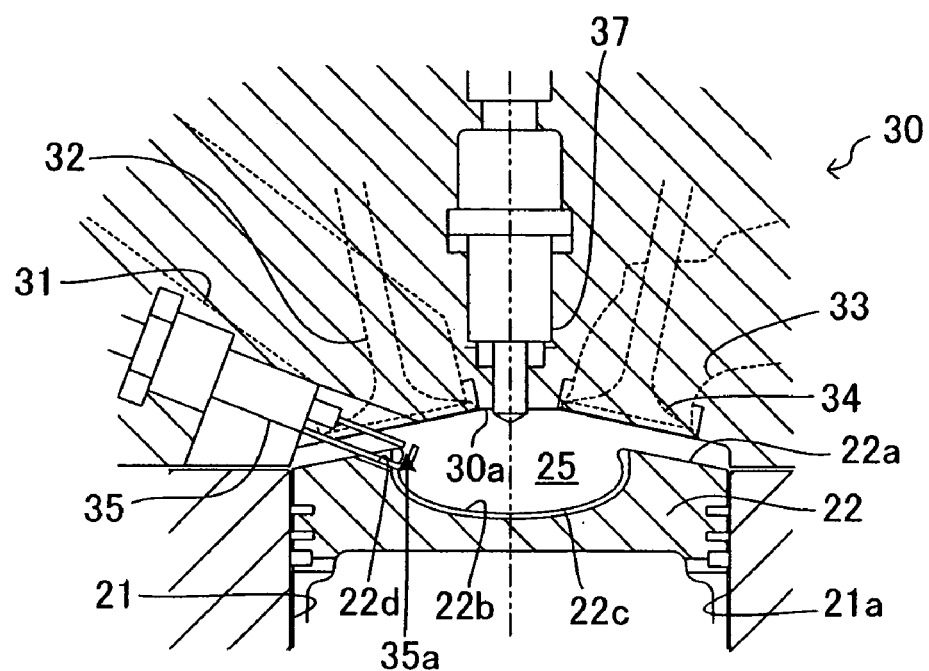
FIG. 2 is a sectional view of a combustion chamber and associated portions shown in FIG. 1 as sectioned by a plane which includes an axis of a cylinder.
Figure 3:
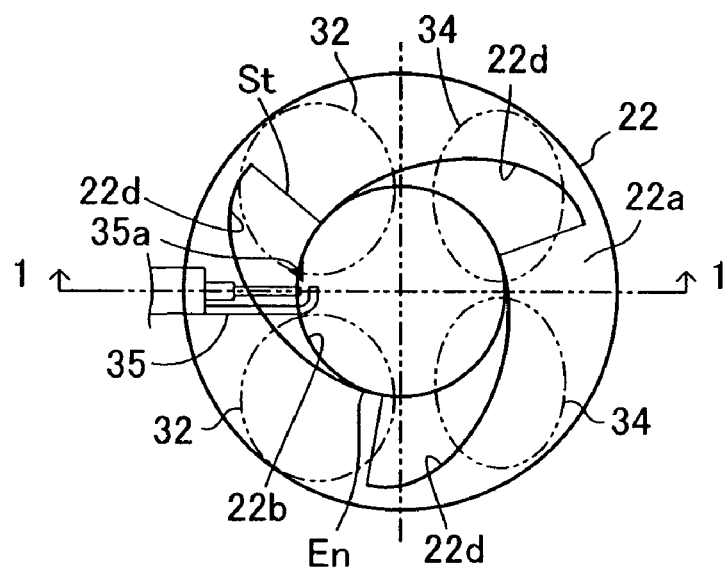
FIG. 3 is a front view of a top surface of a piston shown in FIG. 1.

Next, the structure of the combustion chamber 25 and associated portions will be described in detail with reference to FIGS. 2 and 3. FIG. 2 is a sectional view of the combustion chamber 25 and associated portions as sectioned by a plane which includes the axis of the cylinder 21. FIG. 3 is a front view of the top surface of the piston 22.

As shown in FIG. 2, a bottom surface 30a of the cylinder head section 30 is similar in shape to the bottom surface of a cylinder head which constitutes a so-called pent roof type combustion chamber. As shown in FIG. 3, a single cylinder (combustion chamber 25) has two intake valves 32 and two exhaust valves 34. That is, the internal combustion engine 10 is a so-called "4-valve engine."

As shown in FIG. 2, a circumferential portion of a top surface 22a of the piston 22 is inclined along the cylinder-head bottom surface 30a. A cavity (recess) 22b is formed at the center of the top surface 22a of the piston 22. The cavity 22b has a closed-bottomed and generally cylindrical shape. An edge portion serving as an inlet of the cavity 22b has a diameter smaller than the maximum diameter of the interior of the cavity 22b. A heat-insulating layer 22c of titanium or ceramic (a layer made of a material lower in thermal conductivity than a material (e.g., aluminum) used to form the piston 22) is formed on a wall surface (surface) of the cavity 22b.

Furthermore, as shown in FIGS. 2 and 3, an outer circumferential portion of the cavity 22b has a plurality of (three in the present embodiment) swirl guide grooves 22d for introducing, into the cavity 22b, an intake air swirl which is formed by air flowing into the combustion chamber 25. A surface which forms each swirl guide groove 22d is inclined. The angle of the inclined surface gradually increases from an angle along the top surface 22a of the piston 22 to an angle which is substantially perpendicular to the top surface 22a of the piston 22, as the width of the swirl guide groove 22d (distance between the center of the top surface 22a of the piston 22 and the outer perimeter of the swirl guide groove 22d) decreases, As shown in FIG. 3, in a front view of the top surface 22a of the piston 22, one of the swirl guide grooves 22d has its guide-groove start position St facing one intake valve 32, and its guide-groove end position En facing the other intake valve 32. For convenience of explanation, this swirl guide groove 22d is called "specific swirl guide groove."

The spark plug 35 is a projecting plug which is disposed between two intake ports 31 (thus, between two intake valves 32) such that a spark-generating portion 35a for generating an ignition spark is disposed at an inner circumferential portion of the cavity 22b (a circumferential portion of the interior of the cavity 22b). The vicinity of a tip portion of the spark plug 35 (the vicinity of the spark-generating portion 35a) is disposed so as to, when the piston 22 reaches a position near the top dead center, follow the above-mentioned specific swirl guide groove (so as to be in parallel with and along with the inclined surface of the specific swirl guide groove).

The fuel injection valve 37 is disposed in the cylinder head section 30 such that its injection holes are exposed to the combustion chamber 25 at the cylinder-head bottom surface 30a and at the central position of the combustion chamber 25 and such that a gasoline fuel is injected toward the cavity 22b of the piston 22.

Figure 4:
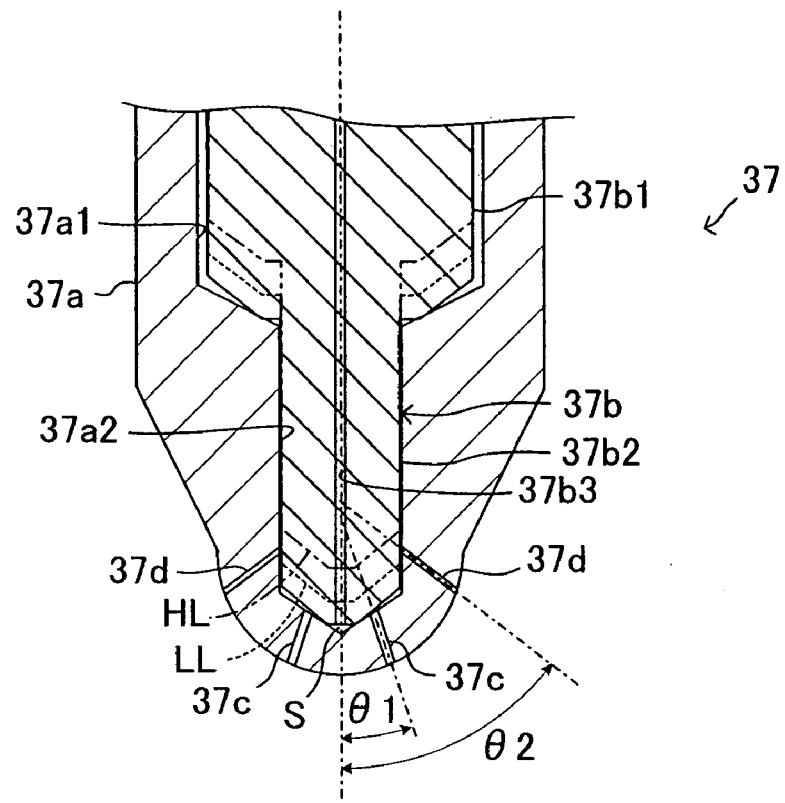
FIG. 4 is a longitudinal sectional view of a tip portion of a fuel injection valve shown in FIG. 1.
Figure 5:
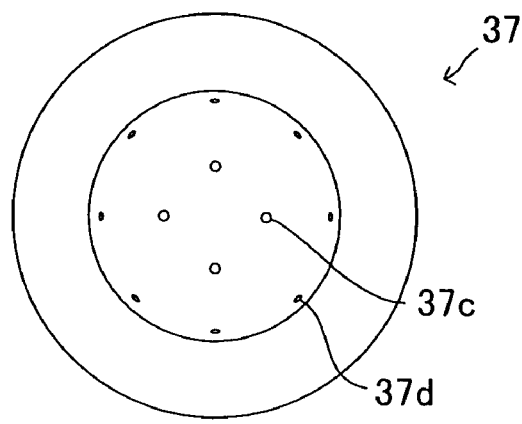
FIG. 5 is a front view of the tip portion of the fuel injection valve shown in FIG. 1.

As shown in FIG. 4, which is a longitudinal sectional view of a tip portion of the fuel injection valve 37, and FIG. 5, which is a front view of the tip portion, the fuel injection valve 37 is an injector which includes a nozzle body 37a, a needle 37b, and an unillustrated electromagnetic mechanism (lift control means) including two solenoids.

The nozzle body 37a has a generally cylindrical shape, and its diameter decreases toward its tip. A tip portion of the nozzle body 37a has a hemispheric shape. The nozzle body 37a has a space in its inside for accommodating the needle 37b. This space includes a large-diameter portion 37a1 and a small-diameter portion 37a2. The large-diameter portion 37a1 assumes a hollow, cylindrical form and is located at the proximal-end side of the nozzle body 37a. The small-diameter portion 37a2 assumes a hollow, cylindrical form having a diameter smaller than that of the large-diameter portion 37a1. The small-diameter portion 37a2 extends from the large-diameter portion 37a1 toward the tip portion of the nozzle body 37a. An apex portion of the small-diameter portion 37a2 has a conical shape.

The hemispherical tip portion of the nozzle body 37a has a plurality of (four in the present embodiment) narrow-angle injection holes 37c and a plurality of (eight in the present embodiment) wide-angle injection holes 37d. The number of the wide-angle injection holes 37d is larger than the number of the narrow-angle injection holes 37c. The plurality of narrow-angle injection holes 37c are collectively called a narrow-angle-injection-hole group, and the plurality of wide-angle injection holes 37d are collectively called a wide-angle-injection-hole group.

The narrow-angle injection holes 37c are radially formed in the nozzle body 37a in the vicinity of the tip of the nozzle body 37a. The plurality of narrow-angle injection holes 37c are arranged equally spaced apart from one another. The axis of each of the narrow-angle injection holes 37c and the axis of the nozzle body 37a form an angle θ1.

The wide-angle injection holes 37d are radially formed in the nozzle body 37a on an area closer to the proximal end with respect to the narrow-angle injection holes 37c. The plurality of wide-angle injection holes 37d are arranged equally spaced apart from one another. The axis of each of the wide-angle injection holes 37d and the axis of the nozzle body 37a form an angle θ2. The angle θ2 is greater than the angle θ1. The wide-angle injection holes 37d are smaller in diameter than the narrow-angle injection holes 37c.

The needle 37b includes a cylindrical base portion 37b1 and a cylindrical tip portion 37b2. The diameter of the base portion 37b1 is slightly smaller than that of the large-diameter portion 37a1. The base portion 37b1 is accommodated in the large-diameter portion 37a1. The diameter of the tip portion 37b2 is slightly smaller than that of the small-diameter portion 37a2. Accordingly, the diameter of the tip portion 37b2 is smaller than that of the base portion 37b1. The tip portion 37b2 is formed in such a manner as to project from the base portion 37b1 toward the tip of the needle 37b and is accommodated in the small-diameter portion 37a2.

An apex portion of the tip portion 37b2 of the needle 37b has the form of a truncated cone. When the needle 37b is not lifted, a circumferential portion (edge portion) of the top surface (upper surface) of the truncated cone abuts the inner wall surface which forms a conical apex portion of the small-diameter portion 37a2 of the nozzle body 37a. Thus, when the needle 37b is not lifted, a closed space S is formed between the top surface of the tip portion 37b2 of the needle 37b and the conical apex portion of the small-diameter portion 37a2 of the nozzle body 37a.

A fuel passage 37b3 having a small diameter is formed in the needle 37b along the axis of the needle 37b and establishes communication between an unillustrated fuel supply section located on the same side as the base portion 37b1 and the top surface of the tip portion 37b2 of the needle 37b. Accordingly, when the needle 37b is not lifted, a distal-end opening of the fuel passage 37b3 opens into the closed space S only. The narrow-angle injection holes 37c are located outward of the closed space S. Accordingly, when the needle 37b is not lifted, communication is cut off between the closed space S and the narrow-angle injection holes 37c.

When an unillustrated first solenoid is energized, the needle 37b moves to a position LL indicated by the broken line in FIG. 4. That is, the lift of the needle 37b becomes low lift. This establishes communication of the narrow-angle injection holes 37c with both the fuel passage 37b3 and the closed space S. By contrast, communication of the wide-angle injection holes 37d with both the fuel passage 37b3 and the closed space S is cut off. As a result, fuel which is supplied to the closed space S through the fuel passage 37b3 is injected only from the narrow-angle injection holes 37c. That is, when the lift of the needle 37b is low lift, a first injection condition is established (or realized) in which fuel is injected at a narrow injection angle.

When both of unillustrated first and second solenoids are energized, the needle 37b moves to a position HL indicated by the alternate-long-and-two-short-dashes line in FIG. 4. The position HL is located at a position closer to the proximal end of the nozzle body 37a than the position LL. That is, the lift of the needle 37b becomes high lift. This establishes communication of the narrow-angle injection holes 37c with both the fuel passage 37b3 and the closed space S, and communication of the wide-angle injection holes 37d with both the fuel passage 37b3 and the closed space S. As a result, fuel which is supplied to the closed space S through the fuel passage 37b3 is injected from the narrow-angle injection holes 37c and from the wide-angle injection holes 37d. That is, when the lift of the needle 37b is high lift, a second injection condition is established (or realized) in which fuel is injected at the narrow injection angle and at a wide injection angle greater than the narrow injection angle.

Referring again to FIG. 1, the internal combustion engine 10 includes an air flowmeter 61, a crank position sensor 62, a cylinder pressure sensor 63 which serves as a cylinder pressure detection means, a cooling-water temperature sensor 64, an accelerator opening sensor 65, and an electric control unit 70.

The air flowmeter 61 outputs a signal indicative of a flow rate of intake air. The crank position sensor 62 outputs a signal which has a narrow pulse every 10° rotation of the crank shaft 24 and a wide pulse every 360° rotation of the crank shaft 24. This signal represents an engine speed NE. The cylinder pressure sensor 63 outputs a signal indicative of pressure (cylinder pressure) P in the combustion chamber 25. The cooling-water temperature sensor 64 outputs a signal indicative of a cooling-water temperature THW of the internal combustion engine 10. The accelerator opening sensor 65 outputs a signal indicative of a travel Accp of an accelerator pedal 66 operated by a driver.

The electric control unit 70 is a microcomputer including a CPU 71 which executes predetermined programs; a ROM 72 in which the programs to be executed by the CPU 71, tables (lookup table and map), constants, and the like are previously stored; a RAM 73 in which the CPU 71 temporarily stores data as needed; a backup RAM 74 which stores data while power is ON and which retains the stored data while power is OFF; and an interface 75 including an AD converter. The CPU 71, the ROM 72, the RAM 73, the backup RAM 74, the interface 75, etc. are bus-connected to one another.

The interface 75 is connected to the sensors 61 to 65; supplies the CPU 71 with signals from the sensors 61 to 65; and sends drive signals to the igniter 36, the fuel injection valve 37, the fuel-pressure-regulating means 38a, the fuel pump 38b, the drive circuit 39, the throttle valve actuator 47a, the bypass-flow-regulating valve 45, and the supercharge-pressure-regulating valve 52a based on instructions from the CPU 71.

Figure 6:
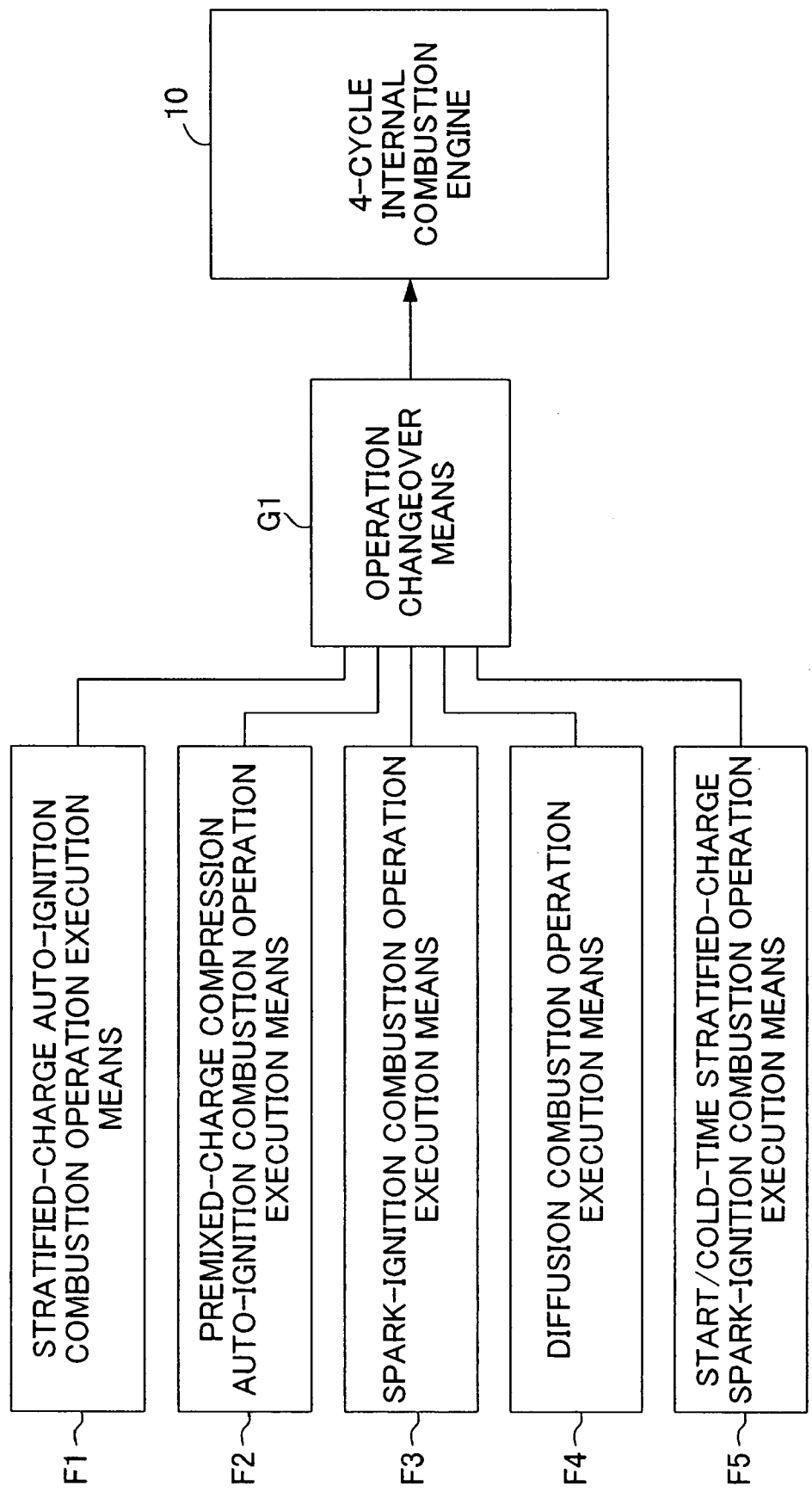
FIG. 6 is a block diagram showing functions which are achieved through execution of predetermined programs by a CPU of an electric control unit shown in FIG. 1.

As shown in FIG. 6, the internal combustion engine 10 includes a stratified-charge auto-ignition combustion operation execution means F1, a premixed-charge compression auto-ignition combustion operation execution means F2, a spark-ignition combustion operation execution means F3, a diffusion combustion operation execution means F4, a start/cold-time stratified-charge spark-ignition combustion operation execution means F5, and an operation changeover means G1. Functions of these means are achieved by executions of associated predetermined programs by the CPU 71 of the electric control unit 70. Accordingly, the following description will be given as if these operations, which actually the CPU 71 realizes, are implemented by these means.

Figure 7:
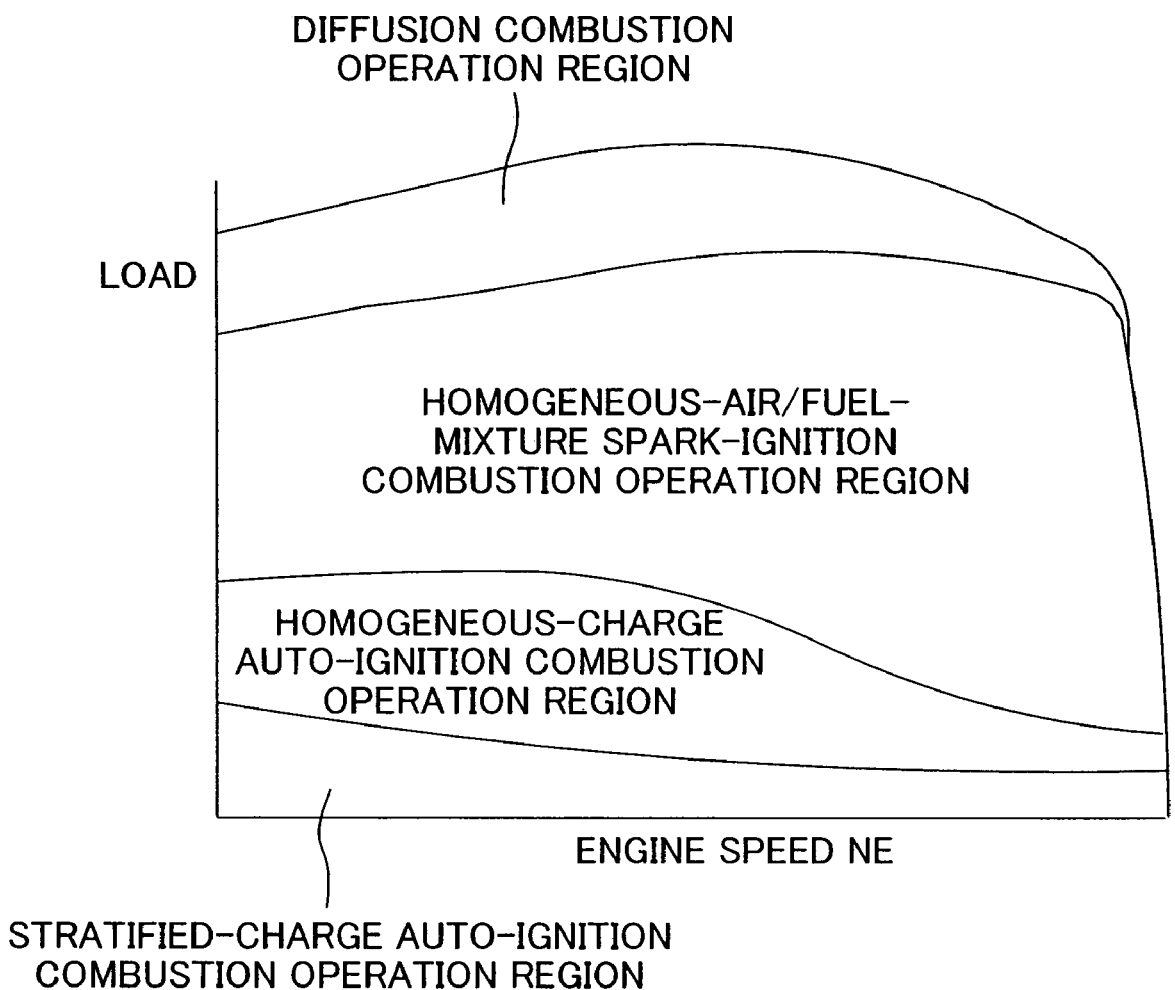
FIG. 7 is an operation region map which operation changeover means shown in FIG. 6 references.

The operation changeover means G1 has an operation region map shown in FIG. 7 in the ROM 72. The operation changeover means G1 determines an operation region based of load on (of) the internal combustion engine 10, the engine speed NE, and the operation region map. The operation changeover means G1 performs an operation according to an operation mode corresponding to the determined operation region. The load on (of) the internal combustion engine 10 may be a required torque Tqtgt which is determined on the basis of the travel Accp of the accelerator pedal 66 and the engine speed NE, or may merely be the travel Accp of the accelerator pedal 66.

According to the operation region map shown in FIG. 7, a very-light-load region in which the load is smaller than a predetermined first load corresponds to a stratified-charge auto-ignition combustion operation region; a light-load region in which the load is greater than the first load and is smaller than a second load greater than the first load corresponds to a homogeneous-charge auto-ignition combustion operation region; a middle-load region in which the load is greater than the second load and smaller than a third load greater than the second load corresponds to a homogeneous-charge spark-ignition combustion operation region; and a high-load region in which the load is greater than the third load corresponds to a diffusion combustion operation region.

(When the Internal Combustion Engine 10 is Operated in the Very-light-load Region)

When the internal combustion engine 10 is operated in the very-light-load region, the operation changeover means G1 selects the stratified-charge auto-ignition combustion operation execution means F1 in accordance with the operation region map. Thus, the internal combustion engine 10 is operated by the stratified-charge auto-ignition combustion operation execution means F1.

Figure 8:
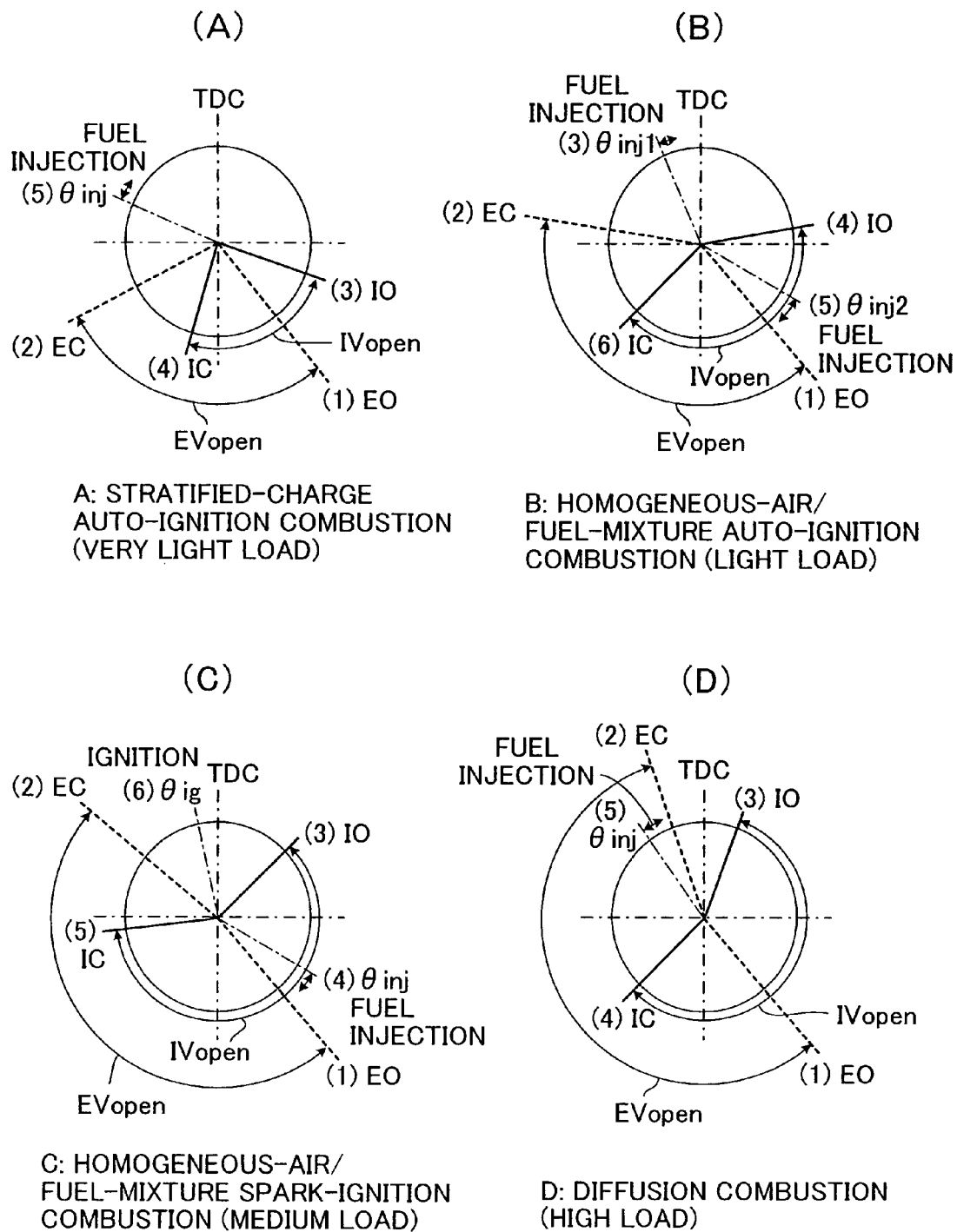
FIG. 8 is a series of diagrams showing valve timing, fuel injection period of time (fuel injection timing), and ignition timing of the internal combustion engine shown in FIG. 1.

The stratified-charge auto-ignition combustion operation execution means F1 forms a homogeneous air/fuel mixture solely within the cavity 22b (i.e., a stratified air/fuel mixture is formed in the combustion chamber 25 as a whole), and compresses the air/fuel mixture to auto-ignites and combust the fuel. More specifically, the stratified-charge auto-ignition combustion operation execution means F1 operates the internal combustion engine 10 by sequentially executing the following actions (see FIG. 8 (A)).

(1) In a combustion stroke, the stratified-charge auto-ignition combustion operation execution means F1 opens the exhaust valves 34 at an exhaust valve opening timing EO for very light load, the opening timing EO varying based on the load of the internal combustion engine 10. This ends the combustion stroke and starts an exhaust stroke.

(2) The stratified-charge auto-ignition combustion operation execution means F1 closes the exhaust valves 34 at an exhaust valve closing timing EC for very light load, closing timing EC varying based on the load of the internal combustion engine 10. This ends the exhaust stroke and starts a negative overlap period.

(3) The stratified-charge auto-ignition combustion operation execution means F1 opens the intake valves 32 at an intake valve opening timing IO for very light load, the opening timing IO varying based of the load of the internal combustion engine 10. This ends the negative overlap period and starts an intake stroke.

(4) The stratified-charge auto-ignition combustion operation execution means F1 closes the intake valves 32 at an intake valve closing timing IC for very light load, the closing timing IC varying based on the load of the internal combustion engine 10. This ends the intake stroke and starts a compression stroke.

(5) The stratified-charge auto-ignition combustion operation execution means F1 injects fuel from the fuel injection valve 37 by a predetermined amount which is determined on the basis of load of the internal combustion engine 10 and the engine speed NE, at timing θinj within the middle stage of the compression stroke, the timing θinj being between the intake valve closing timing IC for very light load and a compression top-dead-center TDC. In this case, the total amount of fuel to be injected is for achieving an ultra lean air/fuel ratio. Furthermore, the stratified-charge auto-ignition combustion operation execution means F1 energizes only the first solenoid of the fuel injection valve 37 so that the lift of the needle of the fuel injection valve 37 becomes the low lift.

Figure 9:
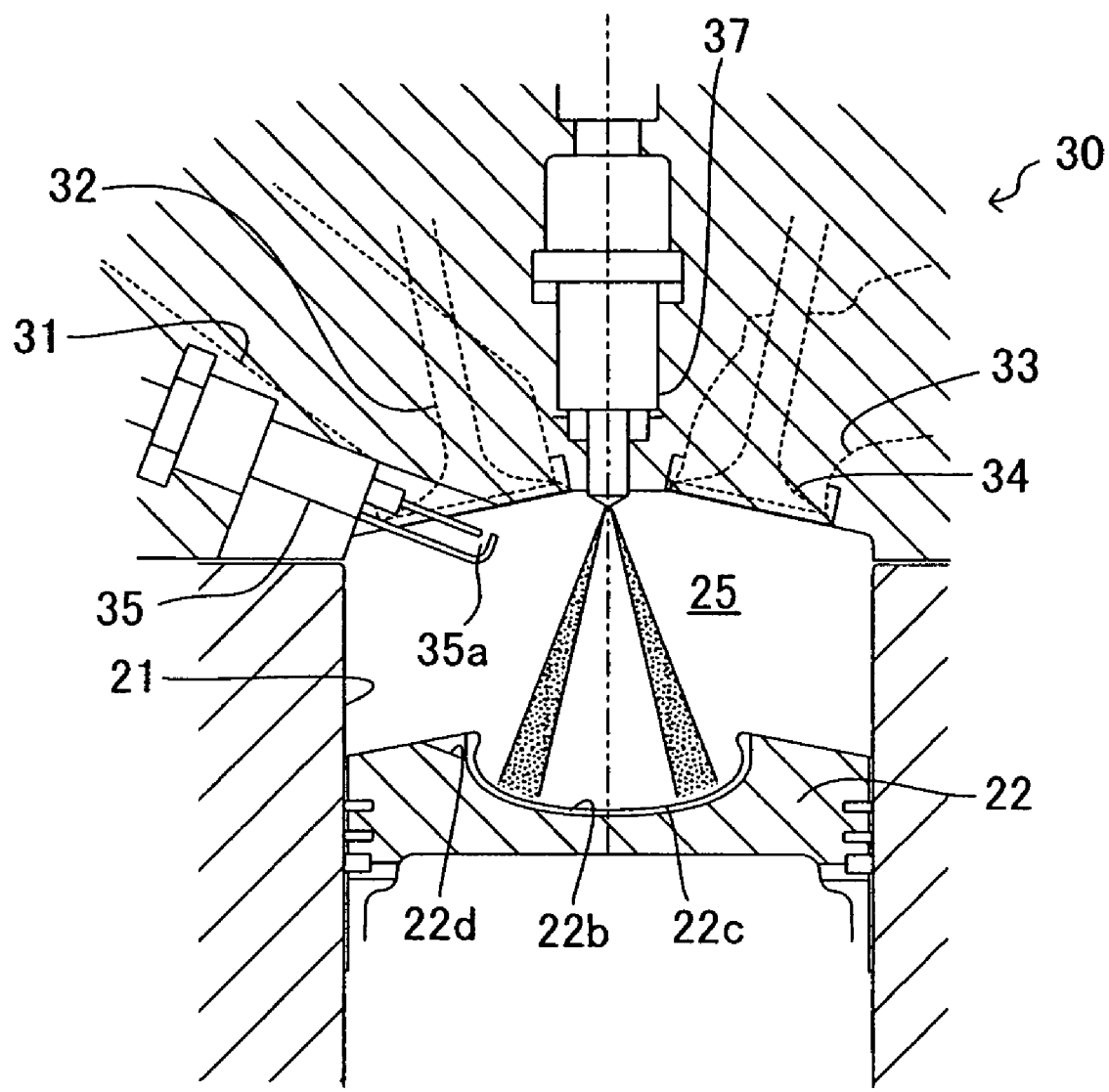
FIG. 9 is a view showing how fuel is injected by stratified-charge auto-ignition combustion operation execution means shown in FIG. 6.

As a result, as shown in FIG. 9, the injected fuel substantially stagnates in the cavity 22b, thereby forming a homogeneous air/fuel mixture substantially solely within the cavity 22b. Then, the homogeneous air/fuel mixture is compressed, thereby starting a combustion stroke in which the fuel is auto-ignited and combusted.

Accordingly, even in a very-light-load operation in which the amount of fuel is small, an air/fuel mixture having sufficiently high concentration for auto-ignition can be reliably formed within the cavity 22b, so that stable auto-ignition combustion can be carried out. As a result, an operation region in which an auto-ignition operation can be performed can be expanded to cover a region of lighter load, thereby eliminating need to perform a spark-ignition combustion operation in such a light-load region. Therefore, $NO_x$ emissions can be reduced more, and fuel economy can further be improved.

The cavity 22b has a closed-bottomed and generally cylindrical shape, and is formed such that an edge portion serving as an inlet of the cavity has a diameter smaller than the maximum diameter of the interior of the cavity. In addition, the swirl guide grooves 22d are formed at the outer circumferential portion of the cavity 22b. The swirl guide grooves 22d are adapted to introduce, into the cavity 22b, an intake air swirl which is generated by air taken into the combustion chamber 25 and swirls along the bore wall surface of the cylinder. Thus, the swirl flow can be efficiently introduced into the cavity 22b by means of the swirl guide grooves 22d.

Since the swirling radius of the intake air swirl becomes smaller, the swirl flow can be intensified. As a result, an air/fuel mixture can be readily formed substantially solely within the cavity 22b, so that generation of $NO_x$ can be restrained.

Meanwhile, fuel is injected in the first injection condition, in which fuel is injected at a narrow injection angle. At the middle stage of the compression stroke at which fuel is injected, a relatively large distance is present between the fuel injection valve 37 and the top surface of the piston 22 on which the cavity 22b is formed. Thus, by injecting fuel in a conical shape (the shape of a cone) having a narrow vertical angle as in the above-mentioned configuration, the injected fuel can be reliably introduced into the cavity 22b and stagnated within the cavity 22b.

Furthermore, the narrow-angle injection holes 37c are greater in diameter than the wide-angle injection holes 37d, and the number of the narrow-angle injection holes 37c is smaller than the number of the wide-angle injection holes 37d. Additionally, since the load of the internal-combustion-engine is small, fuel pressure regulated by the fuel-pressure-regulating means 38a is relatively low. Accordingly, fuel droplets injected from the narrow-angle injection holes 37c become relatively large in diameter, so that fuel can reliably reach the interior of the cavity 22b. As a result, since the amount of fuel which is present at the outside of the cavity 22b and does not contribute to auto-ignition combustion can be reduced, generation of unburnt HC can be restrained, and fuel economy can be improved.

(When the Internal Combustion Engine 10 is Operated in the Light-load Region)

When the internal combustion engine 10 is operated in the light-load region, the operation changeover means G1 selects the premixed-charge compression auto-ignition combustion operation execution means F2 in accordance with the operation region map. Thus, the internal combustion engine 10 is operated by the premixed-charge compression auto-ignition combustion operation execution means F2.

The premixed-charge compression auto-ignition combustion operation execution means F2 premixes air taken into the combustion chamber 25 and fuel injected into the combustion chamber 25 from the fuel injection valve 37 to thereby form and compress a homogeneous air/fuel mixture having uniform spatial distribution of the fuel within the combustion chamber 25 so as to initiate auto-ignition combustion of the fuel. More specifically, the premixed-charge compression auto-ignition combustion operation execution means F2 operates the internal combustion engine 10 by sequentially executing the following actions (see FIG. 8 (B)).

(1) In a combustion stroke, the premixed-charge compression auto-ignition combustion operation execution means F2 opens the exhaust valves 34 at an exhaust valve opening timing EO for light load, the opening timing EO varying based on the load of the internal combustion engine 10. This ends the combustion stroke and starts an exhaust stroke.

(2) The premixed-charge compression auto-ignition combustion operation execution means F2 closes the exhaust valves 34 at an exhaust valve closing timing EC for light load, the closing timing EC varying based on the load of the internal combustion engine 10. This ends the exhaust stroke and starts a negative overlap period. The exhaust valve closing timing EC for light load is set to lag the exhaust valve closing timing EC for very light load.

(3) The premixed-charge compression auto-ignition combustion operation execution means F2 injects a small amount fs of fuel from the fuel injection valve 37 at timing $\theta inj1$ near the exhaust top-dead-center.

(4) The premixed-charge compression auto-ignition combustion operation execution means F2 opens the intake valves 32 at an intake valve opening timing IO for light load, the opening timing IO varying based on the load of the internal combustion engine 10. This ends the negative overlap period and starts an intake stroke. The intake valve opening timing IO for light load is set to lead (be in advance) the intake valve opening timing IO for very light load.

(5) The premixed-charge compression auto-ignition combustion operation execution means F2 injects fuel from the fuel injection valve 37 at a timing when a swirl of air taken into the combustion chamber 25 is the strongest; i.e., at timing $\theta inj2$ within an early stage and/or a middle stage of the intake stroke between the intake valve opening timing IO for light load and an intake valve closing timing IC for light load, mentioned later. At this time, the amount of fuel to be injected is the difference obtained by subtracting the small amount fs from a predetermined amount which is determined on the basis of load of the internal combustion engine 10 and the engine speed NE. Note that, in this case, the total amount of fuel to be injected is for achieving an ultra lean air/fuel ratio.

Figure 10:
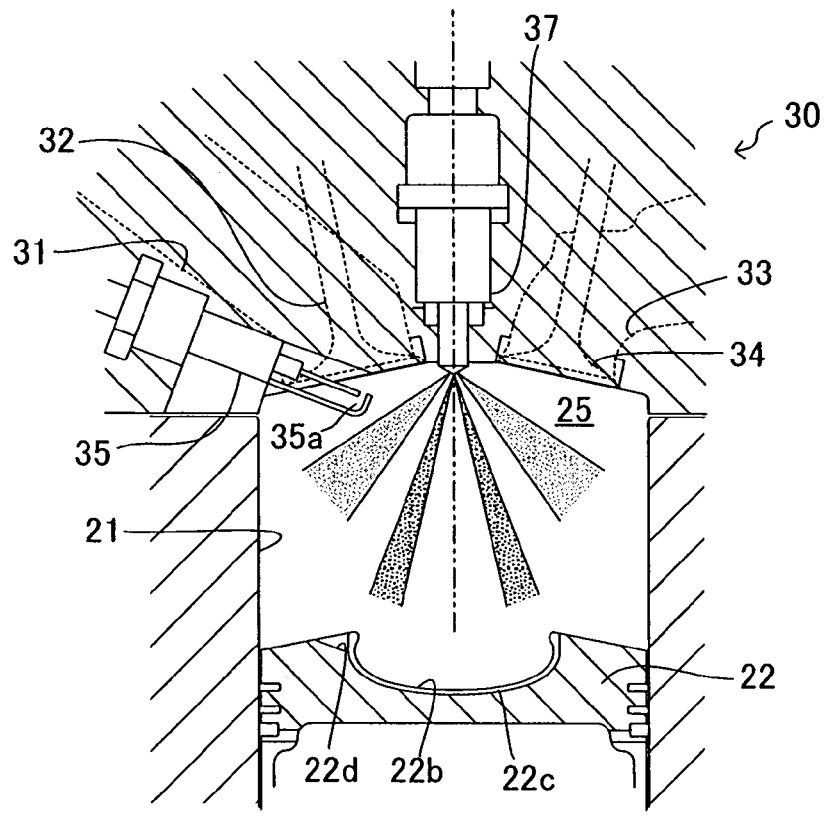
FIG. 10 is a view showing how fuel is injected by premixed-charge compression auto-ignition combustion operation execution means or spark-ignition combustion operation execution means shown in FIG. 6.

Furthermore, in this case, the premixed-charge compression auto-ignition combustion operation execution means F2 energizes both of the first solenoid and the second solenoid of the fuel injection valve 37 so that the lift of the needle of the fuel injection valve 37 reaches the high lift. As a result, fuel is injected as shown in FIG. 10.

(6) The premixed-charge compression auto-ignition combustion operation execution means F2 closes the intake valves 32 at the intake valve closing timing IC for light load, the closing timing IC varying based on the load of the internal combustion engine 10. This ends the intake stroke and starts a compression stroke. The homogeneous air/fuel mixture is compressed, thereby starting a combustion stroke in which the fuel is auto-ignited and combusted.

By virtue of setting of timing of fuel injection as mentioned above, a strong intake air swirl stirs the air/fuel mixture. Also, by virtue of the above-mentioned shape of the cavity 22b and presence of the swirl guide grooves 22d, the air/fuel mixture present at the outside of the cavity 22b can be efficiently taken into the cavity 22b. Therefore, the whole air present within the combustion chamber 25 is utilized for forming a homogeneous air/fuel mixture. As a result, $NO_x$ emissions can be reduced more, and thermal efficiency (fuel economy) can be improved.

Meanwhile, fuel is injected in the second injection condition, in which fuel is injected both at the narrow injection angle and at the wide injection angle greater than the narrow injection angle, at the early stage and/or the middle stage of the intake stroke at which the swirl of air becomes the strongest. Accordingly, the injected fuel reaches the whole region of the combustion chamber 25 and is stirred by the strong swirl flow of air within the combustion chamber 25. Thus, the whole air present within the combustion chamber 25 is utilized for forming a homogeneous air/fuel mixture, so that $NO_x$ emissions can be reduced more, and thermal efficiency (fuel economy) can be improved.

Furthermore, fuel is also injected from the wide-angle injection holes 37d each having a relatively small diameter. Fuel droplets each having a small droplet diameter and injected at the wide angle are stirred while flowing on the swirl flow. As a result, the air and the fuel within the combustion chamber 25 are sufficiently mixed by means of fuel droplets each of which has a small droplet diameter and is injected at the wide angle as a result of injection from the wide-angle injection holes 37d, as well as fuel droplets each of which has a large droplet diameter and is injected at the narrow angle as a result of injection from the narrow-angle injection holes 37c. Thus, the whole air present within the combustion chamber 25 is utilized for forming a homogeneous air/fuel mixture, so that $NO_x$ emissions can be reduced more, and thermal efficiency (fuel economy) can be improved.

(When the Internal Combustion Engine 10 is Operated in the Middle-load Region)

When the internal combustion engine 10 is operated in the middle-load region, the operation changeover means G1 selects the spark-ignition combustion operation execution means F3 in accordance with the operation region map. Therefore, the internal combustion engine 10 is operated by the spark-ignition combustion operation execution means F3.

The spark-ignition combustion operation execution means F3 premixes air taken into the combustion chamber 25 and fuel injected into the combustion chamber 25 from the fuel injection valve 37 to form and compress a homogeneous air/fuel mixture having uniform spatial distribution of the fuel within the combustion chamber 25, and ignites the compressed homogeneous air/fuel mixture by means of an ignition spark generated by the spark plug 35, which serves as the spark-generating means, to thereby initiate spark-ignition combustion of the fuel. More specifically, the spark-ignition combustion operation execution means F3 operates the internal combustion engine 10 by sequentially executing the following actions (see FIG. 8 (C)).

(1) In a combustion stroke, the spark-ignition combustion operation execution means F3 opens the exhaust valves 34 at an exhaust valve opening timing EO for middle-load, the opening timing EO varying based on the load of the internal combustion engine 10. This ends the combustion stroke and starts an exhaust stroke.

(2) The spark-ignition combustion operation execution means F3 closes the exhaust valves 34 at an exhaust valve closing timing EC for middle-load, the closing timing EC varying based on the load of the internal combustion engine 10. This ends the exhaust stroke and starts a negative overlap period. The exhaust valve closing timing EC for middle-load is set to lag the exhaust valve closing timing EC for light load.

(3) The spark-ignition combustion operation execution means F3 opens the intake valves 32 at an intake valve opening timing IO for middle-load, the opening timing IO varying based on the load of the internal combustion engine 10. This ends the negative overlap period and starts an intake stroke. The intake valve opening timing IO for middle-load is set to lead the intake valve opening timing IO for light load.

(4) The spark-ignition combustion operation execution means F3 injects fuel from the fuel injection valve 37 at a timing when a swirl of air taken into the combustion chamber 25 is the strongest; i.e., at timing θinj within an early stage and/or a middle stage of the intake stroke, the timing θinj being between the intake valve opening timing IO for middle-load and an intake valve closing timing IC for middle-load, mentioned later. At this time, the amount of fuel to be injected is determined on the basis of load of the internal combustion engine 10 and the engine speed NE and is a predetermined amount for achieving a theoretical (stoichiometric) air/fuel ratio.

Furthermore, in this case, the spark-ignition combustion operation execution means F3 energizes both of the first solenoid and the second solenoid of the fuel injection valve 37 so that the lift of the needle of the fuel injection valve 37 reaches high lift. As a result, fuel is injected as shown in FIG. 10.

(5) The spark-ignition combustion operation execution means F3 closes the intake valves 32 at the intake valve closing timing IC for middle-load, the closing timing IC varying based on the load of the internal combustion engine 10. This ends the intake stroke and starts a compression stroke. In order to avoid knocking by lowering actual compression ratio, the intake valve closing timing IC for middle-load is set to lag the intake valve closing timing IC for light load.

(6) The spark-ignition combustion operation execution means F3 generates an ignition spark from the spark-generating portion 35*a* of the spark plug 35 at an ignition timing θig near the top dead center, thereby spark-igniting and combusting fuel. At this time, the spark-ignition combustion operation execution means F3 determines the ignition timing θig on the basis of load of the internal combustion engine 10 and the engine speed NE. This starts a combustion stroke.

According to this operation mode, the timing-of-closing-of-intake-valve IC is set to lag the intake valve closing timing IC for light load to thereby lower actual compression ratio, so that occurrence of knocking is avoided. Furthermore, as in the case of light load, by virtue of setting of timing of fuel injection as mentioned above, the above-mentioned shape of the cavity 22*b*, presence of the swirl guide grooves 22*d*, and injection of fuel in the second injection condition, an air/fuel mixture is formed at the inside and the outside of the cavity 22*b*, and the air/fuel mixture can be efficiently taken into the cavity 22*b*. As a result, since the whole air present within the combustion chamber 25 is utilized for forming the homogeneous air/fuel mixture within the cavity 22*b*, stabler spark-ignition combustion is carried out. Thus, $NO_x$ emissions can be reduced more and the thermal efficiency (fuel economy) is improved.

(When the Internal Combustion Engine 10 is Operated in the High-load Region)

When the internal combustion engine 10 is operated in the high-load region, the operation changeover means G1 selects the diffusion combustion operation execution means F4 in accordance with the operation region map. Thus, the internal combustion engine 10 is operated by the diffusion combustion operation execution means F4.

The diffusion combustion operation execution means F4 compresses, within the combustion chamber 25, air taken into the combustion chamber 25, and injects fuel into the compressed air from the fuel injection valve 37, to initiate diffusion combustion of the fuel.

Since an operation through diffusion combustion exhibits lower likelihood of occurrence of knocking than an operation through spark-ignition combustion, the operation through diffusion combustion does not require lowering actual compression ratio by unduly delaying closing-timing of the intake valves 32 (timing-of-closing-of-intake-valve IC). Accordingly, since the internal combustion engine 10 can combust a sufficient amount of fuel (or air/fuel mixture) in the high-load region without abnormal combustion, the internal combustion engine 10 can generate high torque. Furthermore, since gasoline vaporizes more readily than does diesel oil, the speed of the diffusion combustion in the internal combustion engine 10 is high. Thus, the internal combustion engine 10 can generate higher output in a high-engine-speed region.

More specifically, the diffusion combustion operation execution means F4 operates the internal combustion engine 10 by sequentially executing the following actions (see FIG. 8(D)).

(1) In a combustion stroke, the diffusion combustion operation execution means F4 opens the exhaust valves 34 at an exhaust valve opening timing EO for high load, the opening timing EO varying based on the load of the internal combustion engine 10. This ends the combustion stroke and starts an exhaust stroke.

(2) The diffusion combustion operation execution means F4 closes the exhaust valves 34 at an exhaust valve closing timing EC for high load, the closing timing EC varying based on the load of the internal combustion engine 10. This ends the exhaust stroke and starts a negative overlap period. The exhaust valve closing timing EC for high load is set to lag the exhaust valve closing timing EC for middle-load.

(3) The diffusion combustion operation execution means F4 opens the intake valves 32 at an intake valve opening timing IO for high load, the opening timing IO varying based on the load of the internal combustion engine 10. This ends the negative overlap period and starts an intake stroke. The intake valve opening timing IO for high load is set to lead the intake valve opening timing IO for middle-load.

(4) The diffusion combustion operation execution means F4 closes the intake valves 32 at an intake valve closing timing IC for high load, the closing timing IC varying based on the load of the internal combustion engine 10. This ends the intake stroke and starts a compression stroke. The intake valve closing timing IC for high load is set to lead the intake valve closing timing IC for middle-load under the spark-ignition combustion operation. This is because diffusion combustion has lower possibility of occurrence of knocking than spark-ignition combustion.

Figure 11:
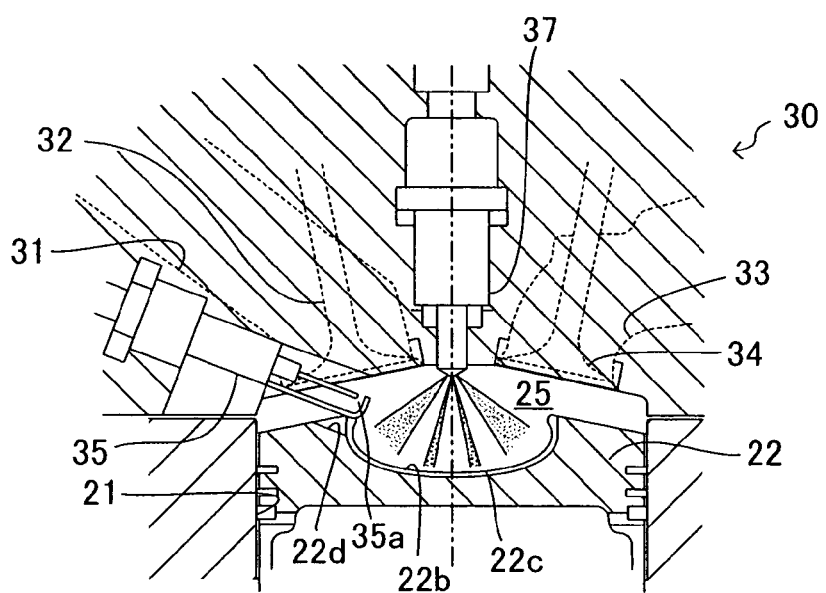
FIG. 11 is a view showing how fuel is injected by diffusion combustion operation execution means shown in FIG. 6.

(5) The diffusion combustion operation execution means F4 injects fuel from the fuel injection valve 37 at timing θinj lagging the intake valve closing timing IC for high load and near the compression top-dead-center. The amount of fuel to be injected is determined on the basis of load of the internal combustion engine 10 and the engine speed NE and is for achieving a predetermined lean air/fuel ratio. Furthermore, in this case, the diffusion combustion operation execution means F4 energizes both of the first solenoid and the second solenoid of the fuel injection valve 37 so that the lift of the needle of the fuel injection valve 37 becomes high lift. As a result, fuel is injected as shown in FIG. 11, and a combustion stroke is started in which fuel is combusted by the diffusion combustion.

According to this operation mode, since the timing-of-closing-of-intake-valve IC (intake valve closing timing IC for high load) is set to lead the intake valve closing timing IC for middle-load under a spark-ignition combustion operation, actual compression ratio does not drop greatly. Also, fuel is combusted through diffusion combustion. As a result, stable combustion can be carried out at high compression ratio without involvement of excessive knocking, so that torque generated by the internal combustion engine 10 can be enhanced.

Also, by virtue of the above-mentioned shape of the cavity 22b and presence of the swirl guide grooves 22d, a strong swirl flow is generated. This swirl flow facilitates mixing of fuel droplets and air (oxygen), so that utilization of air during diffusion combustion can be enhanced. As a result, the thermal efficiency of the internal combustion engine 10 can be improved. Furthermore, since a large amount of oxygen can be present around each of the fuel droplets, the generation of smoke can be effectively restrained.

Furthermore, fuel is injected not only from the narrow-angle injection holes 37c but also from the wide-angle injection holes 37d. The droplet diameter of fuel injected from the wide-angle injection holes 37d is small. Thus, the fuel droplets and air (oxygen) are sufficiently mixed. As a result, the thermal efficiency of the internal combustion engine can be improved. Furthermore, since a large amount of oxygen can be present around each of the fuel droplets, the generation of smoke can be effectively restrained.

(When the Internal Combustion Engine 10 is Started or in a Cold Condition)

When the internal combustion engine 10 is started or in a cold condition, the operation changeover means G1 selects the start/cold-time stratified-charge spark-ignition combustion operation execution means F5. For example, when an unillustrated ignition key is changed in position from OFF to ON, the operation changeover means G1 determines that the internal combustion engine 10 is started; and, when the cooling-water temperature THW detected by the cooling-water temperature sensor 64 is equal to or lower than a threshold water temperature THWth, the operation changeover means G1 determines that the internal combustion engine 10 is in a cold condition. Thus, when the internal combustion engine 10 is started or in a cold condition, the internal combustion engine 10 is operated by the start/cold-time stratified-charge spark-ignition combustion operation execution means F5.

The start/cold-time stratified-charge spark-ignition combustion operation execution means F5 forms and compresses a stratified air/fuel mixture within the cavity 22b; and ignites the compressed stratified air/fuel mixture by means of an ignition spark generated by the spark plug 35, which serves as spark-generating means, to initiate spark-ignition combustion of fuel. More specifically, the start/cold-time stratified-charge spark-ignition combustion operation execution means F5 operates the internal combustion engine 10 by sequentially executing the following actions.

(1) The start/cold-time stratified-charge spark-ignition combustion operation execution means F5 opens the intake valves 32 at a predetermined intake valve opening timing IO for start/cold time, thereby starting an intake stroke.

(2) The start/cold-time stratified-charge spark-ignition combustion operation execution means F5 closes the intake valves 32 at a predetermined intake valve closing timing IC for start/cold time, thereby ending the intake stroke and starting a compression stroke.

(3) The start/cold-time stratified-charge spark-ignition combustion operation execution means F5 injects fuel from the fuel injection valve 37 at a predetermined injection timing within a latter stage of the compression stroke, the predetermined injection timing being between the intake valve closing timing IC for start/cold time and the compression top-dead-center TDC. This enables the injected fuel to substantially stagnate in the cavity 22b. Also, at this point of time, a strong swirl flow is generated within the cavity. Accordingly, by means of this swirl flow, a stratified air/fuel mixture is formed within the cavity 22b.

It is noted that, the amount of fuel to be injected in this case is determined on the basis of the cooling-water temperature THW, and/or, load of the internal combustion engine 10 and the engine speed NE. The amount of fuel to be injected is a predetermined amount for achieving a theoretical (stoichiometric) air/fuel ratio. Furthermore, the start/cold-time stratified-charge spark-ignition combustion operation execution means F5 energizes only the first solenoid of the fuel injection valve 37 so that the lift of the needle of the fuel injection valve 37 becomes low lift.

(4) The start/cold-time stratified-charge spark-ignition combustion operation execution means F5 compresses the stratified air/fuel mixture formed within the cavity 22b and generates an ignition spark from the spark plug 35, which serves as the spark-generating means, at a predetermined ignition timing near the compression top-dead-center TDC. This initiates spark-ignition combustion of fuel, thereby starting a combustion stroke.

(5) The start/cold-time stratified-charge spark-ignition combustion operation execution means F5 opens the exhaust valves 34 at a predetermined exhaust valve opening timing EO for start/cold time. As a result, the combustion stroke ends, and an exhaust stroke starts.

(6) The start/cold-time stratified-charge spark-ignition combustion operation execution means F5 closes the exhaust valves 34 at a predetermined exhaust valve closing timing EC for start/cold time.

When the internal combustion engine 10 is started or in a cold condition, the temperature of a homogeneous air/fuel mixture is unlikely to rise. As a result, auto-ignition combustion is apt to become unstable. In order to cope with this problem, as in the above-mentioned configuration, fuel is injected from the fuel injection valve 37 at the latter stage of the compression stroke after closing of the intake vales 32 and before the compression top-dead-center TDC. This enables the fuel to substantially stagnate in the cavity 22b. Thus, the stratified air/fuel mixture is formed along the inner circumferential portion of the cavity 22b by means of the strong intake air swirl which is generated within the cavity 22b by virtue of the above-mentioned shape of the cavity 22b and presence of the swirl guide grooves 22d. Then, the stratified air/fuel mixture is ignited by the spark plug 35 whose spark-generating portion 35a is located at the inner circumferential portion of the cavity 22b. As a result, the starting performance of the internal combustion engine 10 can be improved, or stable spark-ignition combustion can be carried out during the cold condition.

As described above, the internal combustion engine 10 according to the first embodiment of the present invention is operated through auto-ignition combustion in the light-load region, through spark-ignition combustion in the middle-load region, and through diffusion combustion in the high-load region. As a result, the internal combustion engine 10 is free from occurrence of excessively loud noise which would otherwise result from auto-ignition combustion in the middle-load region, and does not generate large torque variations associated with unstable combustion which would otherwise result from operation through diffusion combustion in the middle-load region.

Furthermore, in the internal combustion engine 10, the cavity 22b has a closed-bottomed and generally cylindrical shape and is formed such that the edge portion serving as the inlet of the cavity 22b has a diameter smaller than the maximum diameter of the interior of the cavity 22b and such that the swirl guide grooves 22d for introducing an intake air swirl into the cavity 22b are formed at an outer circumferential portion of the cavity 22b. Also, the spark plug 35 is disposed along the swirl guide groove 22d.

Accordingly, since the spark plug 35 (the vicinity of a tip portion of the spark plug 35) can be disposed in the swirl guide groove 22d, the spark-generating portion 35a of the spark plug 35 can be readily disposed at the periphery (inner circumferential portion) of the cavity 22b.

Furthermore, the heat-insulating layer is formed on the wall surface of the cavity 22b. Thus, since combustion gas remaining within the cavity 22b becomes unlikely to be cooled, the temperature of an air/fuel mixture to be subjected to the auto-ignition combustion can be raised to high temperature, whereby the auto-ignition combustion can be stably carried out. Additionally, since vaporization of fuel injected toward the cavity 22b can be facilitated, the amount of smoke generated during diffusion combustion can be reduced.

Further, the internal combustion engine 10 includes the turbocharger 81. In the internal combustion engine 10, each of the stratified-charge auto-ignition combustion operation execution means F1, the premixed-charge compression auto-ignition combustion operation execution means F2, the spark-ignition combustion operation execution means F3, and the diffusion combustion operation execution means F4 is configured:

(1) so as to close the exhaust valves 34 before the intake valves 32 are opened, thereby generating a period ranging from timing of closing of the exhaust valves 34 to timing of opening of the intake valves 32; i.e., a negative overlap period, and (2) so as to control timing of closing of the exhaust valves 34 and timing of opening of the intake valves 32 in such a manner that, as load of the internal combustion engine 10 increases, the negative overlap period shortens.

In the "negative overlap period (negative valve overlap period)," combustion gas is confined within the combustion chamber 25. The negative overlap period is set in such a manner that, the greater a load on the internal combustion engine 10, the shorter the negative overlap period. Accordingly, when the internal combustion engine 10 is operated in the light-load region or in the very-light-load region, the amount of air to be introduced into the combustion chamber 25 can be controlled by means of the negative overlap period.

In addition, when the internal combustion engine is operated in a region (middle-load region or high-load region) in which load is greater than in the light-load region, the amount of air to be introduced into the combustion chamber 25 is controlled by means of supercharging by the supercharger and the negative overlap period. As a result, since the throttle valve 47 disposed in an intake passage of the internal combustion engine 10 can be generally held fully open, loss of energy associated with throttling by the throttle valve 47 is reduced, so that fuel economy of the internal combustion engine 10 can be improved.

Furthermore, the fuel injection valve 37 has the narrow-angle-injection-hole group which is opened for injection of fuel when the needle 37b is in either condition of a low-lift condition or a high-lift condition, and the wide-angle-injection-hole group which is opened for injection of fuel only when the needle 37b is in the high-lift condition.

Accordingly, fuel can be injected in the above-mentioned injecting condition (the first injection condition or the second injection condition) that corresponds to an operating condition by means of a Simple configuration. Also, since a dynamic range (difference between a minimum fuel injection amount and a maximum fuel injection amount) of the fuel injection valve 37 can be readily increased, fuel can be injected in sufficient amount even at the time of high load.

Second Embodiment

Next, an internal combustion engine according to a second embodiment of the present invention will be described. This internal combustion engine differs from the internal combustion engine 10 according to the first embodiment only in that the following functions are added to the operation changeover means G1. The following description will be focused on the difference.

(Changeover from the Homogeneous-Premixed-Charge Compression Auto-ignition Operation to the Stratified-charge Auto-ignition Combustion Operation)

As mentioned above, the operation changeover means G1 makes selection from among the operation execution means F1 to F4 in accordance with the operation region map shown in FIG. 7, thereby changing over operation.

Furthermore, in the case where the premixed-charge compression auto-ignition combustion operation execution means F2 is executing a premixed-charge compression auto-ignition combustion operation which combusts a homogeneous air/fuel mixture, the operation changeover means G1 obtains a cylinder pressure average Pi by averaging cylinder pressures P which are detected by the cylinder pressure sensor 63 over a period ranging from start of the compression stroke to end of the combustion stroke associated with a single combustion. Also, the operation changeover means G1 obtains an average cylinder-pressure-average Piave by averaging cylinder pressure averages Pi associated with a plurality of past combustions.

Furthermore, the operation changeover means G1 divides an absolute value of the difference (|Pi−Piave|) between the cylinder pressure average Pi associated with current combustion and the average cylinder-pressure-average Piave by the average cylinder-pressure-average Piave, thereby obtaining ΔP (ΔP=|Pi−Piave|/Piave) which is based on the absolute value of the difference (|Pi−Piave|). When the operation changeover means G1 determines that the auto-ignition combustion by the premixed-charge compression auto-ignition combustion operation execution means F2 has become unstable based on a determination that the value ΔP derived from the absolute value of the difference is in excess of the predetermined value Pth, the operation changeover means G1 changes over operation from the premixed-charge compression auto-ignition operation by the premixed-charge compression auto-ignition combustion operation execution means F2 to the auto-ignition combustion operation by the stratified-charge auto-ignition combustion operation execution means F1.

According to this feature, when the auto-ignition combustion by the premixed-charge compression auto-ignition combustion operation execution means F2 is judged unstable, operation is changed over to the auto-ignition combustion operation executed by the stratified-charge auto-ignition combustion operation execution means F1. Therefore, it is possible to avoid conditions where torque variations or the like occur due to instability in operation of the internal combustion engine.

(Changeover from the Premixed-charge Compression Auto-ignition Operation to the Spark-Ignition Combustion Operation)

Additionally, in the case where the premixed-charge compression auto-ignition combustion operation execution means F2 is executing the premixed-charge compression auto-ignition combustion operation which combusts a homogeneous air/fuel mixture, the operation changeover means G1 obtains an amount of change in cylinder pressure P per unit time or unit crank angle; i.e., a cylinder-pressure-change rate (dP/dt or dP/dθ, wherein t is time, and θ is crank angle), on the basis of cylinder pressure P detected by the cylinder pressure sensor 63. When the obtained cylinder-pressure change rate (dP/dt or dP/dθ) is in excess of a predetermined change rate dPth, the operation changeover means G1 changes over operation from the premixed-charge compression auto-ignition combustion operation which combusts the homogeneous air/fuel mixture and is executed by the premixed-charge compression auto-ignition combustion operation execution means F2 to the spark-ignition combustion operation which combusts the homogeneous air/fuel mixture and is executed by the spark-ignition combustion operation execution means F3.

According to this feature, whether or not noise associated with premixed-charge compression auto-ignition combustion of the homogeneous air/fuel mixture is excessive is judged from whether or not the cylinder-pressure change rate (dP/dt or dP/dθ) is in excess of the predetermined change rate dPth. When it is judged (determined) that noise associated with premixed-charge compression auto-ignition combustion of the homogeneous air/fuel mixture is excessive based on the determination that the cylinder-pressure change rate (dP/dt or dP/dθ) is in excess of the predetermined change rate dPth, operation is changed over from the auto-ignition combustion operation by the premixed-charge compression auto-ignition combustion operation execution means F2 to the spark-ignition combustion operation by the spark-ignition combustion operation execution means F3. Therefore, generation of excessive noise can be avoided.

(Changeover from the Spark-ignition Combustion Operation which Combusts a Homogeneous Air/fuel Mixture to the Diffusion Combustion Operation)

Additionally, when the spark-ignition combustion operation execution means F3 is executing the spark-ignition combustion operation, the operation changeover means G1 detects knocking on the basis of the cylinder pressure P detected by the cylinder pressure sensor 63. For example, the operation changeover means G1 detects, as a cylinder-pressure variation ΔPh, an absolute value of the difference between a local minimum value Psmall of the cylinder pressure and a local maximum value Plarge of the cylinder pressure which appears immediately after the local minimum value Psmall during a period in which the cylinder pressure P is close to the maximum value Pmax. When the cylinder-pressure variation ΔPh is in excess of a predetermined threshold value (e.g., a predetermined fraction of the maximum value Pmax), the operation changeover means G1 determines that knocking has occurred (refer to, for example, Japanese Patent Application Laid-Open (kokai) No. 2004-184228).

Then, the operation changeover means G1 obtains a frequency of occurrence of knocking (a value indicative of how many times knocking has been detected during a single combustion) on the basis of detected knockings. When the obtained frequency of occurrence of knocking is in excess of a predetermined frequency, the operation changeover means G1 changes over operation from the spark-ignition combustion operation by the spark-ignition combustion operation execution means F3 to the diffusion combustion operation by the diffusion combustion operation execution means F4.

According to this feature, before the frequency of knocking becomes excessive, operation is changed over from the spark-ignition combustion operation to the diffusion combustion operation. Therefore, it is possible to avoid excessively frequent occurrence of knocking. It should be noted that the operation changeover means G1 may detect knocking by use of a known knocking sensor which detects knocking on the basis of vibration of an internal combustion engine.

Third Embodiment

Next, an internal combustion engine according to a third embodiment of the present invention will be described. This internal combustion engine has a configuration similar to that of the internal combustion engine 10. However, this internal combustion engine is a 2-cycle internal combustion engine configured so as to perform a 2-cycle operation in which, every 360 degrees of crank angle, an exhaust stroke is started through establishment of communication between the combustion chamber 25 and the exhaust ports 33 (through opening of the exhaust valves 34) while communication is cut off by closing intake valves 32 between the combustion chamber 25 and the intake ports 31 which are configured so as to generate an intake air swirl within the combustion chamber 25; next, a scavenging stroke is started through establishment of communication between the combustion chamber 25 and the intake ports 31 (through opening of the intake valves 32); next, an intake stroke is started through cutoff of the communication between the combustion chamber 25 and the exhaust ports 33 (by closing of the exhaust valves 34); next, a compression stroke is started through cutoff of the communication between the combustion chamber 25 and the intake ports 31 (by closing of the intake valves 32); and subsequently, a combustion stroke is initiated.

Figure 12:
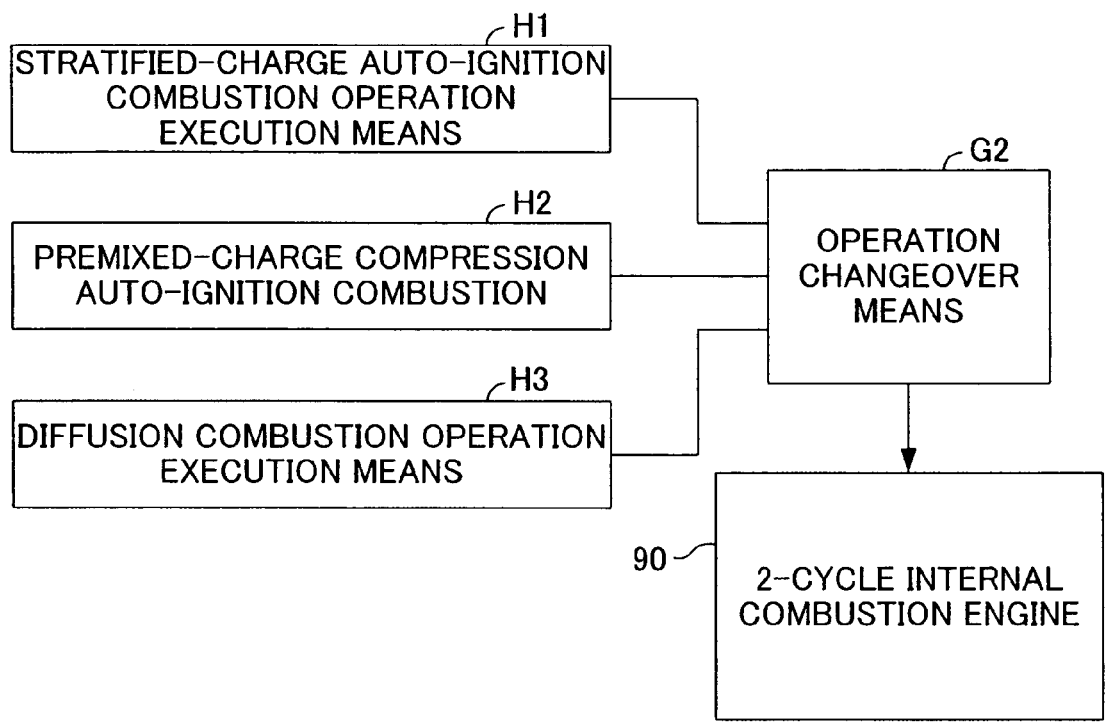
FIG. 12 is a block diagram showing functions which are achieved through execution of predetermined programs by a CPU of an electric control unit of an internal combustion engine according to a third embodiment of the present invention.

As shown in FIG. 12, an internal combustion engine 90 of the type mentioned above includes a stratified-charge auto-ignition combustion operation execution means H1, a premixed-charge compression auto-ignition combustion operation execution means H2, a diffusion combustion operation execution means H3, and an operation changeover means G2. Functions of these means are achieved by executing associated predetermined programs by the CPU 71 of the electric control unit 70. Accordingly, the following description will be given as if these operations, which actually the CPU 71 realizes, are implemented by these means.

Figure 13:
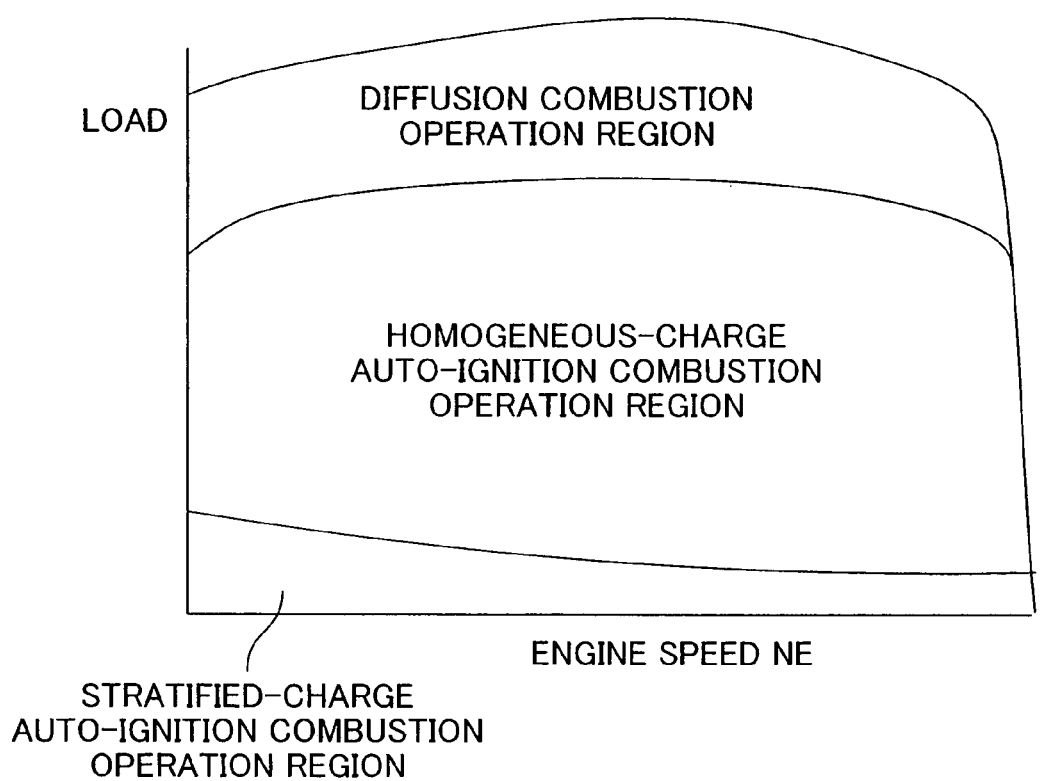
FIG. 13 is an operation region map which operation changeover means shown in FIG. 12 references.

The operation changeover means G2 has an operation region map shown in FIG. 13 in the ROM 72. The operation changeover means G2 determines an operation region on the basis of load of the internal combustion engine 90, the engine speed NE, and the operation region map. The operation changeover means G2 performs an operation according to an operation mode corresponding to the determined operation region. The load of the internal combustion engine 90 may be a required torque Tqtgt which is determined on the basis of the travel Accp of the accelerator pedal 66 and the engine speed NE, or may merely be the travel Accp of the accelerator pedal 66.

According to the operation region map shown in FIG. 13, a very-light-load region in which load is smaller than a predetermined first load corresponds to a stratified-charge auto-ignition combustion operation region; a light-load region and a middle-load region (light/middle-load region) in which load is greater than the first load and is smaller than a third load greater than the first load corresponds to a homogeneous-charge auto-ignition combustion operation region; and a high-load region in which load is greater than the third load corresponds to a diffusion combustion operation region.

(When the Internal Combustion Engine 90 is Operated in the Very-light-load Region)

When the internal combustion engine 90 is operated in the very-light-load region, the operation changeover means G2 selects the stratified-charge auto-ignition combustion operation execution means H1 in accordance with the operation region map. Thus, the internal combustion engine 90 is operated by the stratified-charge auto-ignition combustion operation execution means H1.

Figure 14:
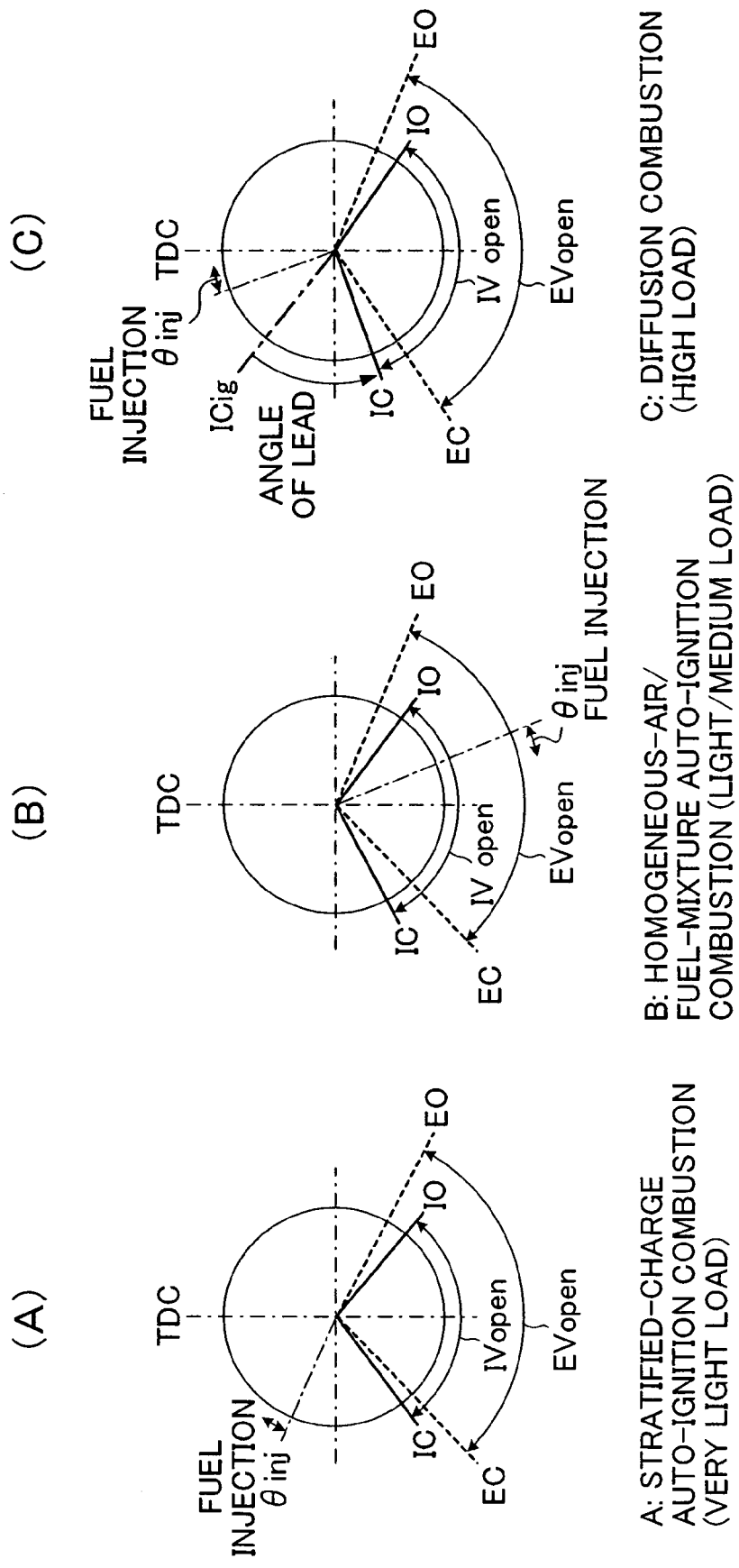
FIG. 14 is a series of diagrams showing valve timing and fuel injection timing of the internal combustion engine according to the third embodiment.

The stratified-charge auto-ignition combustion operation execution means H1 forms a homogeneous air/fuel mixture substantially solely within the cavity 22b (i.e., a stratified air/fuel mixture in the combustion chamber 25 as a whole), and compresses the air/fuel mixture to thereby auto-ignite and combust the fuel. More specifically, the stratified-charge auto-ignition combustion operation execution means H1 operates the internal combustion engine 90 by sequentially executing the following actions (see FIG. 14 (A)).

(1) In a combustion stroke, the stratified-charge auto-ignition combustion operation execution means H1 opens the exhaust valves 34 at an exhaust valve opening timing EO for very light load, the opening timing EO varying based on the load of the internal combustion engine 90. This starts an exhaust stroke in which combustion gas is discharged from the combustion chamber 25 through the exhaust ports 33.

(2) The stratified-charge auto-ignition combustion operation execution means H1 opens the intake valves 32 at an intake valve opening timing IO for very light load, the opening timing IO varying based on the load of the internal combustion engine 90. This starts a scavenging stroke in which air flows into the combustion chamber 25 through the intake ports 31 and in which the air flown into the combustion chamber discharges combustion gas from the combustion chamber 25 through the exhaust ports 33.

(3) The stratified-charge auto-ignition combustion operation execution means H1 closes the exhaust valves 34 at an exhaust valve closing timing EC for very light load, the closing timing EC varying based on the load of the internal combustion engine 90. This ends the scavenging stroke and starts an intake stroke.

(4) The stratified-charge auto-ignition combustion operation execution means H1 closes the intake valves 32 at an intake valve closing timing IC for very light load, the closing timing IC varying based on the load of the internal combustion engine 90. This starts a compression stroke.

(5) The stratified-charge auto-ignition combustion operation execution means H1 injects fuel from the fuel injection valve 37 in a predetermined amount which is determined on the basis of load on the internal combustion engine 90 and the engine speed NE, at timing θinj within the middle stage of the compression stroke, the timing θinj being between the intake valve closing timing IC for very light load and a compression top-dead-center TDC. In this case, the total amount of fuel to be injected is for achieving an ultra lean air/fuel ratio. Furthermore, the stratified-charge auto-ignition combustion operation execution means H1 energizes only the first solenoid of the fuel injection valve 37 so that the lift of the needle of the fuel injection valve 37 becomes low lift.

As a result, as shown in FIG. 9, the injected fuel substantially stagnates in the cavity 22b. Thus, a homogeneous air/fuel mixture is formed substantially solely within the cavity 22b. Then, the homogeneous air/fuel mixture is compressed, and thereafter, a combustion stroke in which the fuel is auto-ignited and combusted is started.

Accordingly, even in the very-light-load operation in which the amount of fuel is small, an air/fuel mixture having sufficiently high concentration for auto-ignition can be reliably formed within the cavity 22b, so that stable auto-ignition combustion can be carried out. As a result, an operation region in which an auto-ignition operation can be performed is expanded to a region of lighter load. Therefore, it is not necessary to perform a spark-ignition combustion operation in such a light-load region, and thus, $NO_x$ emissions can be reduced more, and fuel economy can further be improved.

Also, by virtue of the above-mentioned shape of the cavity 22b and the swirl guide grooves 22d, an intake air can be efficiently taken into the cavity 22b. Thus, since the swirling radius of the intake air swirl becomes small, the swirl flow can be intensified. As a result, a homogeneous air/fuel mixture can be readily formed substantially solely within the cavity 22b, so that generation of $NO_x$ can be restrained.

Meanwhile, fuel is injected in the first injection condition, in which fuel is injected at the narrow injection angle. At the middle stage of the compression stroke at which fuel is injected, a relatively large distance is present between the fuel injection valve 37 and the top surface of the piston 22 on which the cavity 22b is formed. Thus, by injecting fuel in a conical shape (the shape of a cone) having the narrow vertical angle as mentioned, the injected fuel can be reliably introduced into the cavity 22b.

Furthermore, since fuel is injected from the narrow-angle injection holes 37c each having the large diameter, injected fuel droplets become relatively large in diameter. Thus, fuel can reliably reach the interior of the cavity 22b. As a result, since the amount of fuel which is present at the outside of the cavity 22b and does not contribute to the auto-ignition combustion can be reduced, generation of unburnt HC can be restrained, and fuel economy can be improved.

(When the Internal Combustion Engine 90 is Operated in the Light/Middle-load Region)

When the internal combustion engine 90 is operated in the light/middle-load region, the operation changeover means G2 selects the premixed-charge compression auto-ignition combustion operation execution means H2 in accordance with the operation region map. Thus, the internal combustion engine 90 is operated by the premixed-charge compression auto-ignition combustion operation execution means H2.

The premixed-charge compression auto-ignition combustion operation execution means H2 forms and compresses a homogeneous air/fuel mixture within the combustion chamber 25 to thereby initiate auto-ignition combustion of the fuel. More specifically, the premixed-charge compression auto-ignition combustion operation execution means H2 operates the internal combustion engine 90 by sequentially executing the following actions (see FIG. 14 (B)).

(1) In a combustion stroke, the premixed-charge compression auto-ignition combustion operation execution means H2 opens the exhaust valves 34 at an exhaust valve opening timing EO for light/middle-load, the opening timing EO varying based on the load of the internal combustion engine 90. This ends the combustion stroke and starts an exhaust stroke.

(2) The premixed-charge compression auto-ignition combustion operation execution means H2 opens the intake valves 32 at an intake valve opening timing IO for light/middle-load, the opening timing IO varying based on the load of the internal combustion engine 90. This ends the exhaust stroke and starts a scavenging stroke.

(3) The premixed-charge compression auto-ignition combustion operation execution means H2 injects fuel from the fuel injection valve 37 in a predetermined amount which is determined on the basis of load of the internal combustion engine 90 and the engine speed NE, at timing θinj at which a swirl of air taken into the combustion chamber 25 is the strongest during a period of time ranging from establishment of communication between the combustion chamber 25 and the intake ports 31 to cutoff of the communication (during a period of time ranging from opening of the intake valves 32 to closing of the intake valves 32).

The total amount of fuel to be injected in this case is for achieving an ultra lean air/fuel ratio. Furthermore, in this case, the premixed-charge compression auto-ignition combustion operation execution means H2 energizes both of the first solenoid and the second solenoid of the fuel injection valve 37 so that the lift of the needle of the fuel injection valve 37 becomes high lift. Thus, fuel is injected as shown in FIG. 10.

Since the timing of fuel injection is set as mentioned above, and fuel is injected according to the second injection condition, the injected fuel reaches the whole region of the combustion chamber 25 and is stirred by a strong swirl flow of air within the combustion chamber 25. Furthermore, since the cavity 22b is formed such that the air/fuel mixture present at the outside of the cavity 22b can be efficiently taken into the cavity 22b, the whole air present within the combustion chamber 25 is utilized for forming a homogeneous air/fuel mixture in the cavity 22b. As a result, $NO_x$ emissions can be reduced more, and thermal efficiency (fuel economy) can be improved.

(4) The premixed-charge compression auto-ignition combustion operation execution means H2 closes the exhaust valves 34 at an exhaust valve closing timing EC for light/middle-load, the closing timing EC varying based on the load of the internal combustion engine 90. This ends the scavenging stroke and starts an intake stroke.

(5) The premixed-charge compression auto-ignition combustion operation execution means H2 closes the intake valves 32 at the intake valve closing timing IC for light/middle-load, the closing timing IC varying based on the load of the internal combustion engine 90. This ends the intake stroke and starts a compression stroke. The formed homogeneous air/fuel mixture is compressed, thereby starting the combustion stroke in which the fuel is auto-ignited and combusted.

(When the Internal Combustion Engine 90 is Operated in the High-load Region)

When the internal combustion engine 90 is operated in the high-load region, the operation changeover means G2 selects the diffusion combustion operation execution means H3 in accordance with the operation region map. Thus, the internal combustion engine 90 is operated by the diffusion combustion operation execution means H3.

The diffusion combustion operation execution means H3 compresses, within the combustion chamber 25, air taken into the combustion chamber 25, and injects fuel into the compressed air from the fuel injection valve 37, thereby initiating diffusion combustion of the fuel. More specifically, the diffusion combustion operation execution means H3 operates the internal combustion engine 90 by sequentially executing the following actions (see FIG. 14 (C)).

(1) In a combustion stroke, the diffusion combustion operation execution means H3 opens the exhaust valves 34 at an exhaust valve opening timing EO for high load, the opening timing EO varying based on the load of the internal combustion engine 90. This starts the exhaust stroke.

(2) The diffusion combustion operation execution means H3 opens the intake valves 32 at an intake valve opening timing IO for high load, the opening timing IO varying based on the load of the internal combustion engine 90. This starts the scavenging stroke.

(3) The diffusion combustion operation execution means H3 closes the exhaust valves 34 at an exhaust valve closing timing EC for high load, the closing timing EC varying based on the load of the internal combustion engine 90. This starts the intake stroke.

(4) The diffusion combustion operation execution means H3 closes the intake valves 32 at an intake valve closing timing IC for high load, the closing timing IC varying based on the load of the internal combustion engine 90. This starts the compression stroke.

The intake valve closing timing IC for high load (i.e., timing of cutoff of the communication between the combustion chamber 25 and the intake ports 31) is set to a timing which leads a timing of cutting off the communication between the combustion chamber and the intake port which is determined to avoid excessive occurrence of knocking under the assumption that spark-ignition combustion is carried out in the high-load region, in which the diffusion combustion operation is actually performed, (i.e., the intake valve closing timing IC for high load is set to a timing generally coinciding with the intake valve closing timing IC for light/middle-load).

(5) Next, the diffusion combustion operation execution means H3 injects fuel from the fuel injection valve 37 at fuel-injection timing θinj near the top dead center during he compression stroke, thereby starting the combustion stroke in which fuel is combusted through diffusion combustion. The amount of fuel to be injected is determined on the basis of load of the internal combustion engine 90 and the engine speed NE and is for achieving a predetermined lean air/fuel ratio. Furthermore, in this case, the diffusion combustion operation execution means H3 energizes both of the first solenoid and the second solenoid of the fuel injection valve 37 so that the lift of the needle of the fuel injection valve 37 becomes high lift. As a result, fuel is injected as shown in FIG. 11.

According to the above feature, since timing of cutoff of the communication between the combustion chamber 25 and the intake ports 31 leads timing which, if spark-ignition combustion is carried out, will be set for cutting off communication between the combustion chamber 25 and the intake ports 31 for the purpose of avoiding excessive occurrence of knocking, actual compression ratio does not drop greatly. Also, the fuel is combusted through diffusion combustion. As a result, stable combustion can be carried out at high compression ratio without involvement of excessive knocking, so that torque to be generated by the internal combustion engine 90 can be enhanced.

Fourth Embodiment

Next, an internal combustion engine according to a fourth embodiment of the present invention will be described. This internal combustion engine is a so-called uniflow-type 2-cycle internal combustion engine and uses gasoline as fuel.

First, an outline of operation (operation cycle) of the 2-cycle internal combustion engine will be described with reference to FIG. 15.

This uniflow-type internal combustion engine includes an exhaust port EXP connected to an upper portion of a combustion chamber (cylinder CY); an exhaust valve EXV for opening/closing the exhaust port EXP; an intake port (also called a scavenging port) INP whose one end is connected to a bore wall of the cylinder CY; a fuel injection valve INJ; a spark plug IGN; and a supercharger (in this case, a turbocharger) T/C. This internal combustion engine generates power by combusting a mixture of fuel and air while moving a piston PS within the cylinder CY and opening/closing the exhaust valve EXV (exhaust port EXP) as well as the intake port INP. Strokes of operation will be sequentially described while taking auto-ignition combustion of a homogeneous air/fuel mixture as an example.

Figure 15:
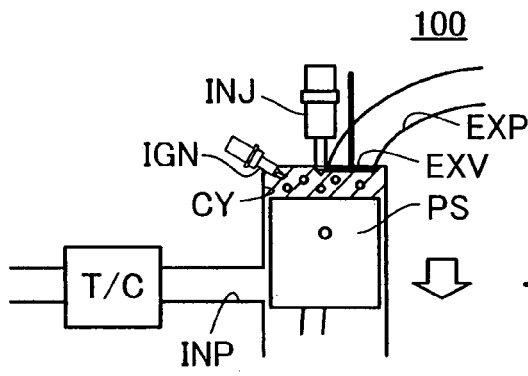
FIG. 15 is a series of views for explaining the outline of operation of an internal combustion engine according to a fourth embodiment of the present invention.
Figure 15:
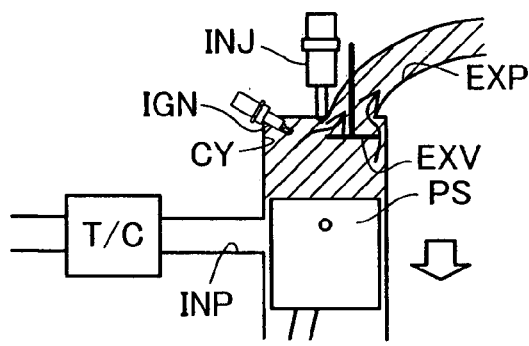
Figure 15:
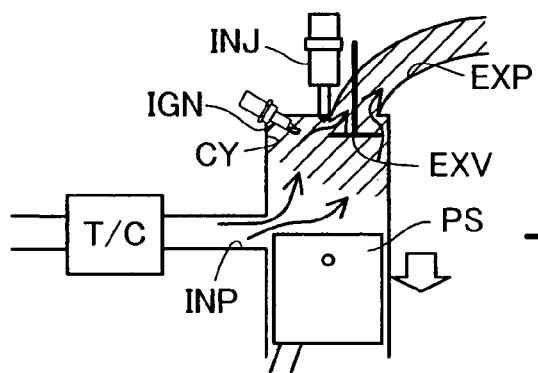
Figure 15:
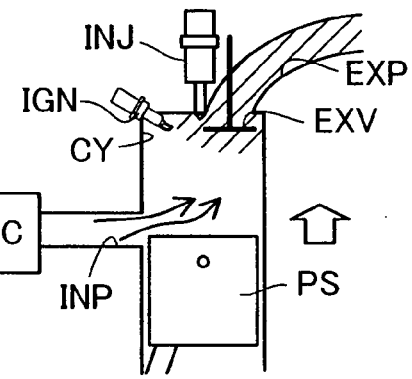
Figure 15:
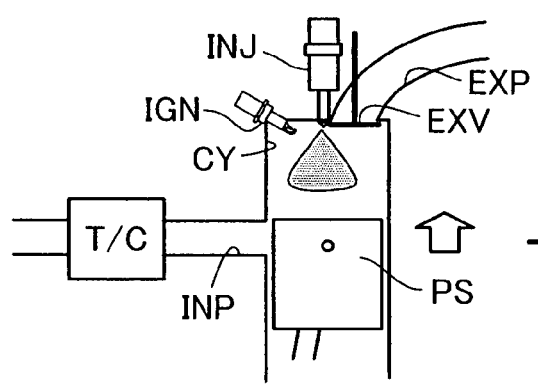
Figure 15:
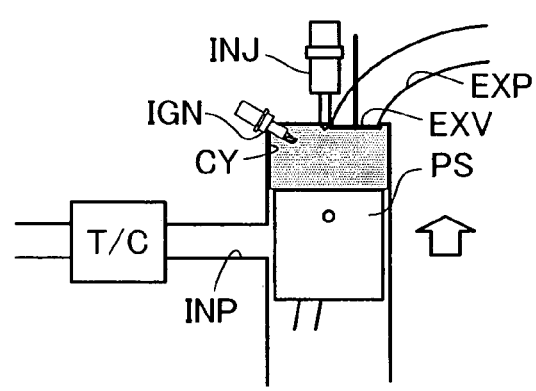

As shown in FIG. 15(*a*), when an air/fuel mixture is ignited, the air/fuel mixture starts combusting to thereby generate high-pressure combustion gas within the cylinder CY. This starts a combustion stroke (expansion stroke) in which the piston PS moves from the top dead center toward the bottom dead center.

Next, at appropriate timing at which the piston PS reaches a predetermined position, the exhaust valve EXV is opened. At this point of time, the pressure of combustion gas within the cylinder CY is high. Thus, as shown in FIG. 15(*b*), the combustion gas is discharged to the exterior of the cylinder CY through the exhaust valve EX and the exhaust port EXP. The piston PS continues to move toward the bottom dead center.

Subsequently, when the piston PS further moves toward the bottom dead center and reaches a predetermined position, an end portion (opening portion or scavenge portion) of the intake port INP which has been closed by the side wall of the piston PS is opened. This establishes communication between the intake port INP and the cylinder CY. The interior of the intake port INP is pressurized by the turbocharger T/C. Accordingly, when the opening portion of the intake port INP is opened, air in the intake port INP flows into the cylinder CY. The inflow air pushes out the combustion gas of the cylinder CY toward the exhaust valve EXV. As shown in FIG. 15(*c*), the combustion gas is further discharged through the exhaust port EXP. That is, scavenging starts.

Next, the piston PS passes the bottom dead center and begins to move toward the top dead center. Even at this stage, the pressure of air within the intake port INP is high, and therefore, as shown in FIG. 15(*d*), scavenging continues.

Subsequently, when the piston PS continues to move toward the top dead center and reaches the aforementioned predetermined position, the side wall of the piston PS closes the end portion (opening portion) of the intake port INP. This cuts off communication between the intake port INP and the cylinder CY. Immediately before or after this, the exhaust valve EXV is opened. At this point of time, as shown in FIG. 15(*e*), fuel is injected from the fuel injection valve INJ.

The piston PS continues to move toward the top dead center. As a result, as shown in FIG. 15(*f*), a homogeneous air/fuel mixture is formed and compressed, and auto-ignition combustion is started when the piston PS reaches near the top dead center. What has been described is the outline of operation of the uniflow-type 2-cycle internal combustion engine.

Figure 16:
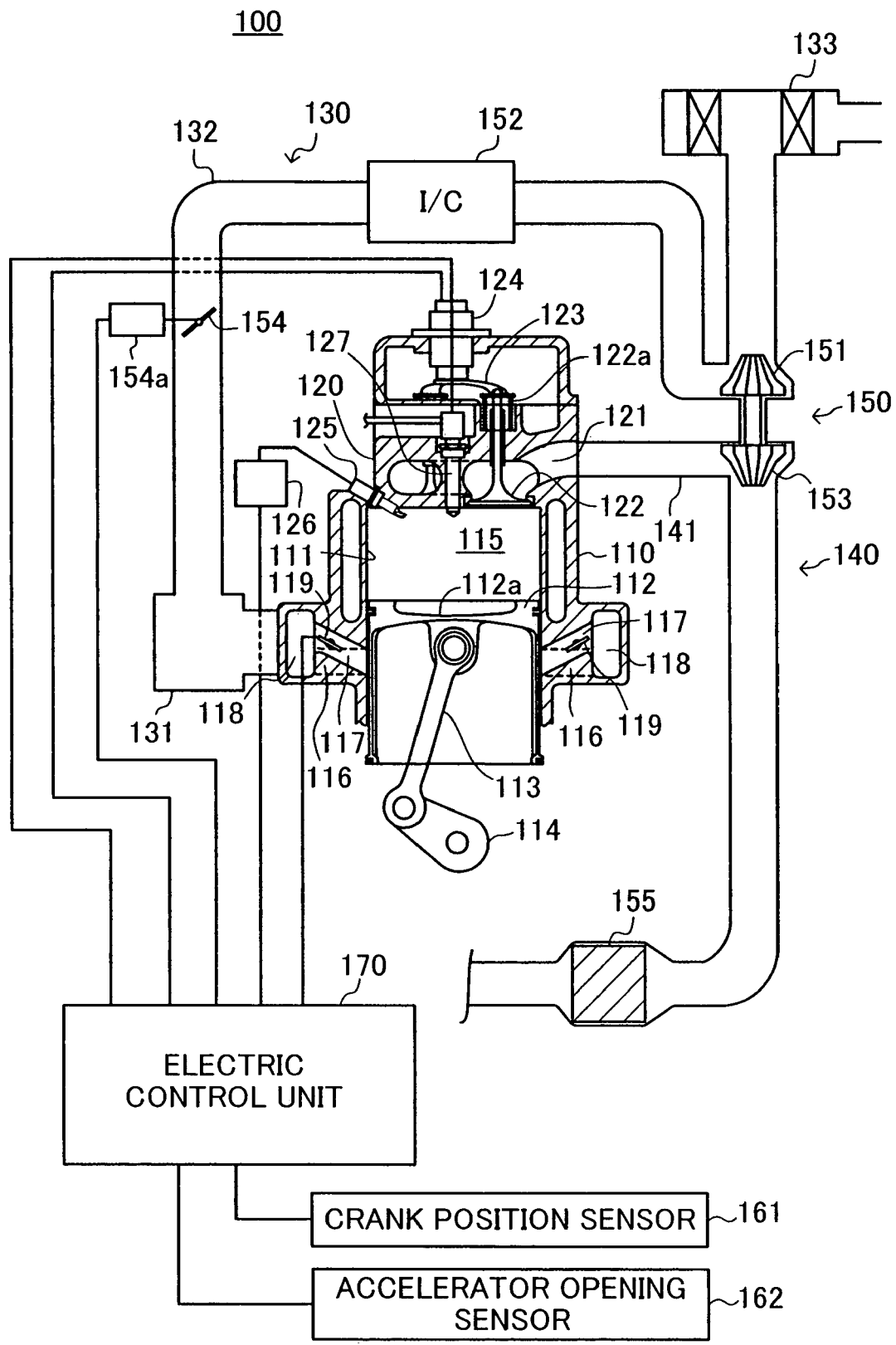
FIG. 16 is a schematic configurational view of the internal combustion engine according to the fourth embodiment.

The configuration of the uniflow-type internal combustion engine will next be described. FIG. 16 shows the schematic configuration of an internal combustion engine 100. FIG. 16 shows a section of a specific cylinder only, but other cylinders also have a similar configuration.

The internal combustion engine 100 includes a cylinder block 110; a cylinder head 120 fixed on the cylinder block 110; an intake system 130; an exhaust system 140 for discharging exhaust gas to the exterior of the engine; and an electric control unit 170. In the following description, a direction from the cylinder block 11 toward the cylinder head 120 is called "upward," and a direction from the cylinder head 120 toward the cylinder block 110 is called "downward."

The cylinder block 110 has a hollow, cylindrical cylinder 111. The cylinder block 110 accommodates a piston 112; a connecting rod 113, and a crank shaft 114. The piston 112 reciprocates within the cylinder 111. The reciprocating motion of the piston 112 is transmitted to the crankshaft 114 via the connecting rod 113, thereby rotating the crankshaft 114. The bore wall surface of the cylinder 111, the top surface (piston head) of the piston 112, and the bottom surface of the cylinder head 120 form a combustion chamber 115. A cavity 112*a* is formed at a central portion of the piston 112. The cavity 112*a* has a closed-bottomed and generally cylindrical shape as in the case of the cavity 22*b*.

Furthermore, the cylinder block 110 includes a pair of first intake ports 116, a pair of second intake ports 117, and an intake surge tank 118 and has a pair of intake control valves 119.

Figure 17:
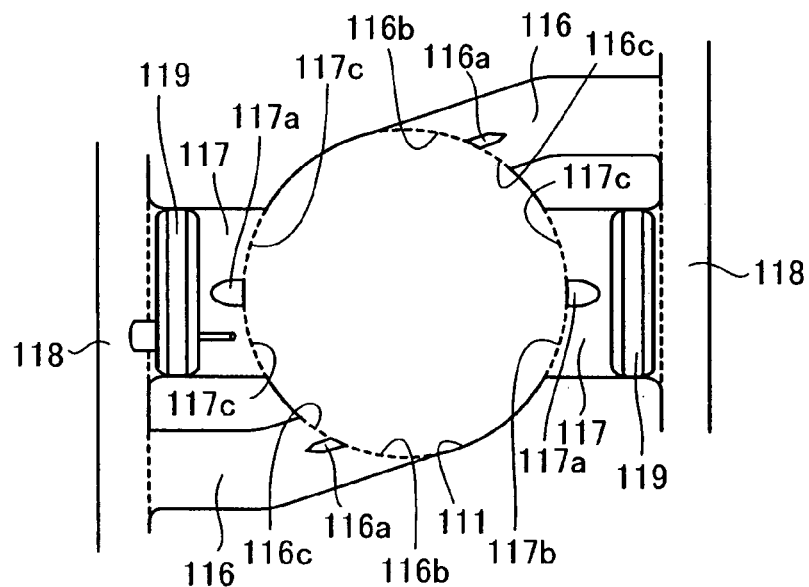
FIG. 17 is a sectional view of a cylinder, an intake surge tank, and an intake port of the internal combustion engine shown in FIG. 16 as sectioned by a plane perpendicular to an axis of the cylinder.

Each of the first intake ports 116 has a tubular shape. The first intake port 116 is formed such that its axis is substantially parallel with a plane which is perpendicular to the axis of the cylinder 111. As shown in a schematically sectional view of FIG. 17, the first intake port 116 is connected to the intake surge tank 118 and to the cylinder 111, and is adapted to introduce air into the cylinder 111 along the bore wall surface of the cylinder 111. Thus, air which flows into the combustion chamber 115 through the intake port 116 generates an intake air swirl within the combustion chamber 115; therefore, the intake port 116 is called a swirl port.

Each of the first intake ports 116 is halved by a rib 116*a* in the vicinity of the cylinder 111. This forms two opening portions 116*b* and 116*c*, at the bore wall surface of the cylinder 111. The opening portions 116*b* and 116*c* are provided at such a position as to be opened by the side wall of the piston 112 when the piston 112 moves from the top dead center toward the bottom dead center (i.e., downward). When the opening portions 116*b* and 116*c* are opened, communication is established between the first intake ports 116 and the combustion chamber 115. On the other hand, the opening portions 116*b* and 116*c* are closed by the side wall of the piston 112 when the piston 112 moves from the bottom dead center to the top dead center (i.e., upward). This cuts off communication between the first intake ports 116 and the combustion chamber 115.

Each of the second intake ports 117 has a tubular shape. The second intake port 117 is connected to the intake surge tank 118 and the cylinder 111. The second intake port 117 is formed in such a manner as to be inclined relative to the plane which is perpendicular to the axis of the cylinder 111, so that air flows obliquely downward into the cylinder 111. The axis of the second intake port 117 is directed to the axis of the cylinder 111. The second intake port 117 is called a straight port.

Each of the second intake ports 117 is halved by a rib 117*a* in the vicinity of the cylinder 111. This forms two opening portions 117*b* and 117*c* at the bore wall surface of the cylinder 111. The opening portion 117*b* of one intake port 117 faces the opening portion 117*c* of the other intake port 117 with the cylinder 111 intervening therebetween, and the opening portion 117c of one intake port 117 faces the opening portion 117b of the other intake port 117 with the cylinder 111 intervening therebetween.

The opening portions 117b and 117c are provided at such a position as to be opened by the side wall of the piston 112 when the piston 112 moves downward. When the opening portions 117b and 117c are opened, communication is established between the second intake ports 117 and the combustion chamber 115. Meanwhile, the opening portions 117b and 117c are closed by the side wall of the piston 112 when the piston 112 moves upward. This cuts off communication between the second intake ports 117 and the combustion chamber 115.

As a result of employment of this configuration, air which flows into the cylinder 111 through each of the second intake ports 117 impinges on the top surface of the piston 112 to change its direction obliquely upward. Also, air which flows into the cylinder 111 through the two opposed intake ports 117 (through the opening portions 117b and 117c of the two opposed intake ports 117) collides in the vicinity of the axis of the cylinder 111. This generates, within the cylinder 111, an up-current of air which rises along the axis of the cylinder 111.

An intake control valve 119 moves pivotally within each of the second intake ports 117 according to an instruction from the electric control unit 170, for opening/closing the second intake port 117.

Referring again to FIG. 16, the cylinder head 120 is fixed on an upper portion of the cylinder block 110. The cylinder head 120 includes exhaust ports 121 connected to the combustion chamber 115; exhaust valves 122; a drive arm 123 for driving the exhaust valves 122; an electromagnetic actuator 124; a spark plug 125; an igniter 126 including an ignition coil which generates high voltage to be applied to the spark plug 125; and a fuel injection valve (fuel injection means) 127 for directly injecting fuel into the combustion chamber 115. The spark plug 125 and the igniter 126 constitute a spark-generating means for generating an ignition spark within the combustion chamber 115.

Figure 18:
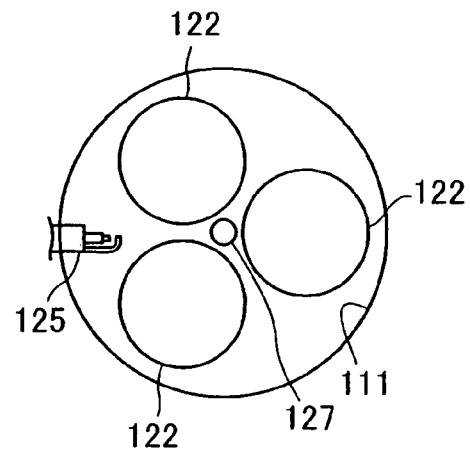
FIG. 18 is a view of a bottom side of a cylinder head shown in FIG. 16 as viewed from a combustion chamber.

As shown in FIG. 18 which shows the bottom side of the cylinder head 120 as viewed from the combustion chamber 115, the exhaust ports 121 is configured to open at three respective positions around the center of the cylinder 111. Accordingly, three exhaust valves 122 are provided on the cylinder head 120. The exhaust valves 122 open/close the respective openings of the exhaust ports 121. Communication of the exhaust ports 121 with the combustion chamber 115 is established when the openings of the exhaust ports 121 are opened by the respective exhaust valves 122, and is cut off when the openings of the exhaust ports 121 are closed by the respective exhaust valves 122.

Figure 19:
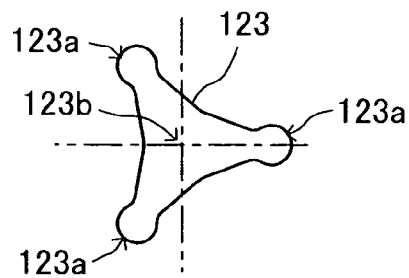
FIG. 19 is a front view of a drive arm shown in FIG. 16.

The three exhaust valves 122 are arranged in such a manner that their axes are in parallel with one another (in parallel with the axis of the cylinder 111). Springs 122a bias the respective exhaust valves 122 so as to close the openings of the exhaust ports 121 which open into the combustion chamber 115. The three exhaust valves 122 are connected, at their upper end portions, to three respective end portions 123a of the drive arm 123 shown in FIG. 19. The electromagnetic actuator 124 moves a central portion 123b of the drive arm 123 downward to move the exhaust valves 122 downward, so that the openings of the exhaust ports 121 which are formed to open into the combustion chamber 115 is opened.

The fuel injection valve 127 has the same structure as the aforementioned fuel injection valve 37. Fuel in an unillustrated fuel tank is supplied to the fuel injection valve 127 by an unillustrated fuel-pressure-regulating means and an unillustrated fuel pump. As shown in FIG. 18, the fuel injection valve 127 is disposed at the center of the cylinder 111. The fuel injection valve 127 injects fuel toward the cavity 112a of the piston 112.

The intake system 130 includes a surge tank 131 communicating with the intake surge tank 118; an intake pipe 132 whose one end is connected to the surge tank 131; and an air filter 133, a compressor 151 of a turbocharger (supercharger or supercharging means) 150, an intercooler 152, and a throttle valve 154 which are sequentially disposed in the intake pipe 132 from the other end of the intake 132 toward a downstream side (surge tank 131).

The throttle valve 154 is rotatably supported by the intake pipe 132 and is driven by a throttle valve actuator 154a, thereby varying the cross-sectional area of the opening of an intake passage.

The exhaust system 140 includes an exhaust pipe 141 including an exhaust manifold, communicating with the exhaust ports 121, and forming an exhaust passage together with the exhaust ports 121; a turbine 153 of the turbocharger 150 disposed in the exhaust pipe 141; and a catalytic converter 155 disposed in the exhaust pipe 141 downstream of the turbine 153. As in the case of the turbocharger 81, the turbocharger 150 compresses air in the intake passage and thereby supercharges the combustion chamber 115 with air.

The internal combustion engine 100 includes a crank position sensor 161, an accelerator opening sensor 162, and an electric control unit 170 which is connected to these devices. The crank position sensor 161, the accelerator opening sensor 162, and the electric control unit 170 have the same configuration and function as those of the crank position sensor 62, the accelerator opening sensor 65, and the electric control unit 70, respectively.

Figure 20:
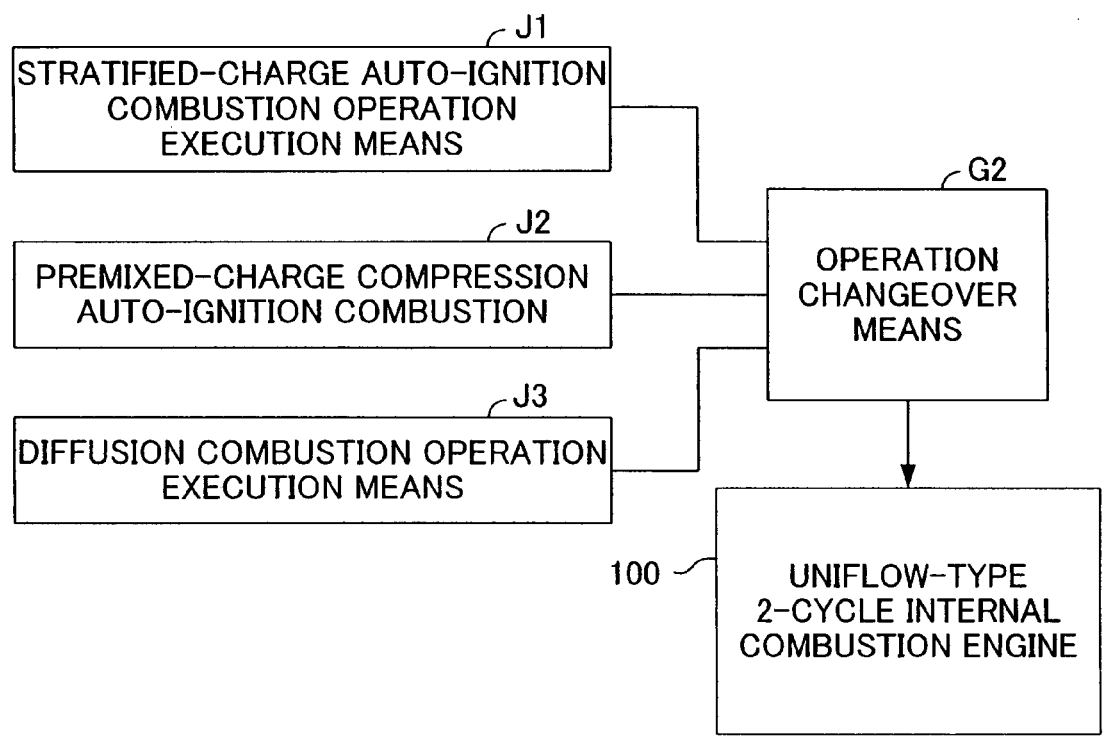
FIG. 20 is a block diagram showing functions which are achieved through execution of predetermined programs by a CPU of an electric control unit of the internal combustion engine shown in FIG. 16.

As shown in FIG. 20, the internal combustion engine 100 includes a stratified-charge auto-ignition combustion operation execution means J1, a premixed-charge compression auto-ignition combustion operation execution means J2, a diffusion combustion operation execution means J3, and an operation changeover means G2. Functions of these means are achieved by executing associated predetermined programs by the CPU of the electric control unit 170. Accordingly, the following description will be given as if these operations, which actually the CPU realizes, are implemented by these means.

(When the Internal Combustion Engine 100 is Operated in the Very-light-load Region)

When the internal combustion engine 100 is operated in the very-light-load region, the operation changeover means G2 selects the stratified-charge auto-ignition combustion operation execution means J1 in accordance with the operation region map shown in FIG. 13. Thus, the internal combustion engine 100 is operated by the stratified-charge auto-ignition combustion operation execution means J1.

The stratified-charge auto-ignition combustion operation execution means J1 forms a homogeneous air/fuel mixture substantially solely within the cavity 112a (i.e., it forms a stratified air/fuel mixture in the combustion chamber 25 as a whole), and compresses the air/fuel mixture to auto-ignite and combust the fuel. More specifically, the stratified-charge auto-ignition combustion operation execution means J1 operates the internal combustion engine 100 by sequentially executing the following actions (see. FIG. 21 (A)).

(1) In a combustion stroke, the stratified-charge auto-ignition combustion operation execution means J1 opens the exhaust valves 122 at an exhaust valve opening timing EO for very light load, the opening timing EO varying based on the load of the internal combustion engine 100. This starts an exhaust stroke in which communication is established between the exhaust ports 121 and the combustion chamber 115, whereby combustion gas is discharged from the combustion chamber 115.

(2) Next, movement of the piston 112 from a top-dead-center side toward a bottom-dead-center side establishes communication of the first intake ports 116 and the second intake ports 117 with the combustion chamber 115 at an intake port opening timing IPO. At this time, the intake control valves 119 are controlled so as to close the respective second intake ports 117. Accordingly, air flows into the combustion chamber 115 through the first intake ports 116, so that an intake air swirl is generated. The inflow air pushes combustion gas toward the exhaust ports 121, and thus, the combustion gas is discharged from the combustion chamber 115. That is, a scavenging stroke starts.

(3) Next, movement of the piston 112 from the bottom-dead-center side toward the top-dead-center side cuts off communication of the first intake ports 116 and the second intake ports 117 with the combustion chamber 115 at an intake port closing timing IPC. At the same time, an exhaust valve closing timing EC for very light load, the timing varying based on the load of the internal combustion engine 100, is reached, so that the stratified-charge auto-ignition combustion operation execution means J1 closes the exhaust valves 122. This starts a compression stroke.

(4) The stratified-charge auto-ignition combustion operation execution means J1 injects fuel from the fuel injection valve 127 in a predetermined amount which is determined on the basis of load of the internal combustion engine 100 and the engine speed NE, at timing $\theta$inj within the middle stage of the compression stroke, the timing $\theta$inj being after the intake port closing timing IPC and the exhaust valve closing timing EC for very light load but before a compression top-dead-center TDC. In this case, the total amount of fuel to be injected is for achieving an ultra lean air/fuel ratio. Furthermore, the stratified-charge auto-ignition combustion operation execution means J1 energizes only the first solenoid of the fuel injection valve 127 so that the lift of the needle of the fuel injection valve 127 becomes low lift.

As a result, the injected fuel substantially stagnates in the cavity 112a, so that a homogeneous air/fuel mixture is formed substantially solely within the cavity 112a. Then, the homogeneous air/fuel mixture is compressed, and thus, a combustion stroke in which the fuel is auto-ignited and combusted is started.

Accordingly, even in a very-light-load operation in which the amount of fuel is small, an air/fuel mixture having sufficiently high concentration for auto-ignition can be reliably formed within the cavity 112a, so that stable auto-ignition combustion can be carried out. As a result, an operation region in which an auto-ignition operation can be performed is expanded to cover a region of far lighter load, thereby eliminating need to perform a spark-ignition combustion operation in such a very-light-load region. Therefore, $NO_x$ emissions can be reduced more, and fuel economy can further be improved. Also, since the amount of fuel which is present at the outside of the cavity 112a and does not contribute to auto-ignition combustion can be reduced, generation of unburnt HC can be restrained, and fuel economy can be improved more.

(When the Internal Combustion Engine 100 is Operated in the Light/Middle-load Region)

When the internal combustion engine 100 is operated in the light/middle-load region, the operation changeover means G2 selects the premixed-charge compression auto-ignition combustion operation execution means J2 in accordance with the operation region map. Thus, the internal combustion engine 100 is operated by the premixed-charge compression auto-ignition combustion operation execution means J2.

The premixed-charge compression auto-ignition combustion operation execution means J2 forms and compresses a homogeneous air/fuel mixture within the combustion chamber 115 to thereby initiate auto-ignition combustion of the fuel. More specifically, the premixed-charge compression auto-ignition combustion operation execution means J2 operates the internal combustion engine 100 by sequentially executing the following actions (see FIG. 21 (B)).

(1) In a combustion stroke, the premixed-charge compression auto-ignition combustion operation execution means J2 opens the exhaust valves 122 at an exhaust valve opening timing EO for light/middle-load, the opening timing EO varying based on the load of the internal combustion engine 100. This starts an exhaust stroke.

(2) Next, the communication of the first intake ports 116 and the second intake ports 117 with the combustion chamber 115 is established at the intake port opening timing IPO. This starts a scavenging stroke. At this time, the intake control valves 119 are controlled so as to close the respective second intake ports 117. Accordingly, an intake air swirl is generated. Also, in this scavenging stroke, air intake is carried out.

(3) Next, the communication of the first intake ports 116 and the second intake ports 117 with the combustion chamber 115 is cut off at the intake port closing timing IPC. Subsequently, an exhaust valve closing timing EC for light/middle-load, the closing timing EC varying based on the load of the internal combustion engine 100; is reached, so that the premixed-charge compression auto-ignition combustion operation execution means J2 closes the exhaust valves 122. This starts a compression stroke.

(4) The premixed-charge compression auto-ignition combustion operation execution means J2 injects fuel from the fuel injection valve 127 in a predetermined amount which is determined on the basis of load of the internal combustion engine 100 and the engine speed NE, at timing $\theta$inj within the early stage of the compression stroke, the timing $\theta$inj being simultaneous with or slightly lagging the exhaust valve closing timing EC for light/middle-load. That is, the premixed-charge compression auto-ignition combustion operation execution means J2 injects fuel at a light/middle-load injection timing $\theta$inj which leads a very-light-load injection timing $\theta$inj, to hereby form a homogeneous air/fuel mixture.

In this case, the total amount of fuel to be injected in this case is for achieving an ultra lean air/fuel ratio. Furthermore, in this case, the premixed-charge compression auto-ignition combustion operation execution means J2 energizes both of the first solenoid and the second solenoid of the fuel injection valve 127 so that the lift of the needle of the fuel injection valve 127 becomes high lift.

At this stage, the intake air swirl still remains strong. Accordingly, an air/fuel mixture is stirred by the intake air swirl, whereby the whole air present within the combustion chamber 115 is utilized for forming the homogeneous air/fuel mixture. The homogeneous air/fuel mixture is taken in the cavity 112a and then compressed, thereby starting the combustion stroke in which the fuel is auto-ignited and combusted. As a result, $NO_x$ emissions can be reduced more, and thermal efficiency (fuel economy) can be improved.

(When the Internal Combustion Engine 100 is Operated in the High-load Region)

When the internal combustion engine 100 is operated in the high-load region, the operation changeover means G2 selects the diffusion combustion operation execution means J3 in accordance with the operation region map. Thus, the internal combustion engine 100 is operated by the diffusion combustion operation execution means J3.

The diffusion combustion operation execution means J3 compresses, within the combustion chamber 115, air taken into the combustion chamber 115, and injects fuel into the compressed air from the fuel injection valve 127, thereby initiating diffusion combustion of the fuel. More specifically, the diffusion combustion operation execution means J3 operates the internal combustion engine 100 by sequentially executing the following actions (see FIG. 21 (C)).

(1) In a combustion stroke, the diffusion combustion operation execution means J3 opens the exhaust valves 122 at an exhaust valve opening timing EO for high load, the opening timing EO varying based on the load of the internal combustion engine 100. This starts an exhaust stroke.

(2) Next, the communication of the first intake ports 116 and the second intake ports 117 with the combustion chamber 115 is established at the intake port opening timing IPO. This starts a scavenging stroke. At this time, the intake control valves 119 are controlled so as to open the respective second intake ports 117.

(3) Next, the communication of the first intake ports 116 and the second intake ports 117 with the combustion chamber 115 is cut off at the intake port closing timing IPC. The intake port closing timing IPC does not vary depending on load. In other words, the intake port closing timing IPC leads timing-of-closing-of-intake-valve ICig which, if an overhead-valve internal combustion engine as shown in FIG. 1 carries out spark-ignition combustion in the high-load region in which the diffusion combustion operation is actually performed, will be set for the purpose of avoiding excessive occurrence of knocking (i.e., the intake port closing timing IPC is the intake port closing timing for light/middle-load).

(4) Next, an exhaust valve closing timing EC for high load, the closing timing EC varying based on the load of the internal combustion engine 100, is reached, so that the diffusion combustion operation execution means J3 closes the exhaust valves 122. This starts a compression stroke.

(5) Next, the diffusion combustion operation execution means J3 injects fuel from the fuel injection valve 127 at fuel-injection timing θinj near the top dead center of the compression stroke within the compression stroke, to thereby initiate diffusion combustion of the fuel. The amount of fuel to be injected is determined on the basis of load of the internal combustion engine 100 and the engine speed NE. Furthermore, in this case, the diffusion combustion operation execution means J3 energizes both of the first solenoid and the second solenoid of the fuel injection valve 127 so that the lift of the needle of the fuel injection valve 127 becomes high lift.

According to this feature, since timing of cutoff of the communication of the combustion chamber 115 with the first intake ports 116 and the second intake ports 117 at high load is the same as (coincides with) that at light/middle-load, actual compression ratio does not drop greatly. As a result, excessive knocking is not involved. In addition, fuel is combusted through the diffusion combustion. Thus, stable combustion can be carried out at high compression ratio, so that torque to be generated by the internal combustion engine 100 can be enhanced.

As in the case of the 2-cycle internal combustion engine 90, in the 2-cycle internal combustion engine 100, high-temperature combustion gas can be immediately used to increase the temperature of an air/fuel mixture to be subjected to the next combustion, so that auto-ignition combustion can be stably carried out. Accordingly, an operation region in which an auto-ignition combustion operation is performed can be expanded to cover a region of lower load. As a result, since an auto-ignition combustion operation can be performed in a practical region, $NO_x$ emissions can be reduced, and fuel economy can be improved.

Additionally, in the high-load region, supercharging by the turbocharger 150 and diffusion combustion are carried out, thereby enabling combustion without involvement of knocking. As a result, the internal combustion engine 100 can generate a large maximum torque.

It should be noted that, in the internal combustion engine 100, the scavenging stroke and the intake stroke are simultaneously carried out. However, the internal combustion engine 100 may be configured so as to perform a 2-cycle operation in which, every 360 degrees of crank angle, an exhaust stroke is started through establishment of communication between the combustion chamber 115 and the exhaust ports 121 while communication is cut off between the combustion chamber 115 and the intake ports 116; next, a scavenging stroke is started through establishment of communication between the combustion chamber 115 and the intake ports 116; next, an intake stroke is started through cutoff of the communication between the combustion chamber 115 and the exhaust ports 121; next, a compression stroke is started through cutoff of the communication between the combustion chamber 115 and the intake ports 116; and subsequently, a combustion stroke is initiated.

As described above, the embodiments of the internal combustion engine according to the present invention are configured so as to perform at least the auto-ignition combustion operation which combusts a homogeneous air/fuel mixture, at lighter load, and at least the diffusion combustion operation at higher load. Accordingly, fuel economy can be improved; NOx emissions can be reduced; and high torque can be generated while knocking is avoided. Since a spark-ignition combustion operation region can be eliminated or made smaller, NOx emissions can be reduced, and fuel economy can be improved. Furthermore, in the case where the spark-ignition combustion operation region can be eliminated, an ignition-spark-generating means, such as a spark plug and an igniter, can be eliminated, so that the cost of an internal combustion engine can be lowered.

The present invention is not limited to the above-described embodiments and can be modified in various other forms without departing from the scope of the invention. For example, the above embodiments employ a turbocharger as a supercharger; however, a mechanical supercharger may be used. Also, in operation by the stratified-charge auto-ignition combustion operation execution means, in operation by the premixed-charge compression auto-ignition combustion operation execution means, and in operation by the diffusion combustion operation execution means, an ignition spark may be supplementally generated for stabler combustion.

The invention claimed is:

1. An internal combustion engine comprising:
fuel injection means for injecting a gasoline fuel into a combustion chamber which is defined by a top surface of a piston, a bore wall surface of a cylinder, and a bottom surface of a cylinder head of the internal combustion engine; and
premixed-charge compression auto-ignition combustion operation execution means for, when the internal combustion engine is operated in a light-load region, premixing air taken into the combustion chamber and the fuel injected into the combustion chamber from the fuel injection means, and forming and compressing a homogeneous air/fuel mixture having uniform spatial distribution of the fuel to thereby initiate auto-ignition combustion of the fuel;

the internal combustion engine further comprising diffusion combustion operation execution means for, when the internal combustion engine is operated in a high-load region in which load is greater than in the light-load region, compressing air taken into the combustion chamber within the combustion chamber and injecting the fuel into the compressed air from the fuel injection means to thereby initiate diffusion combustion of the fuel in place of the auto-ignition combustion of the fuel.

2. An internal combustion engine according to claim 1, configured so as to perform a 4-cycle operation in which, every 720 degrees of crank angle, an intake stroke, a compression stroke, a combustion stroke, and an exhaust stroke are repeated, and comprising:

swirl-generating means for generating an intake air swirl within the combustion chamber through intake of the air into the combustion chamber;

spark-generating means for generating an ignition spark within the combustion chamber; and spark-ignition combustion operation execution means for, when the internal combustion engine is operated in a middle-load region in which load is greater than in the light-load region and smaller than in the high-load region, premixing air taken into the combustion chamber and the fuel injected into the combustion chamber from the fuel injection means, forming and compressing a homogeneous air/fuel mixture having uniform spatial distribution of the fuel, and igniting the compressed homogeneous air/fuel mixture by means of an ignition spark generated by the spark-generating means to thereby initiate spark-ignition combustion of the fuel;

wherein the premixed-charge compression auto-ignition combustion operation execution means is configured so as to open an intake valve at an intake valve opening timing for light load, the opening timing varying based on the load of the internal combustion engine, so as to close the intake valve at an intake valve closing timing for light load, the closing timing varying based on the load of the internal combustion, and so as to inject the fuel from the fuel injection means at an injection timing within an early stage and/or a middle stage of an intake stroke, at which a swirl of air taken into the combustion chamber is the strongest, the injection timing being between the intake valve opening timing for light load and the intake valve closing timing for light load, to thereby form the homogeneous air/fuel mixture;

the spark-ignition combustion operation execution means is configured so as to open the intake valve at an intake valve opening timing for middle-load, the opening timing varying based on the load of the internal combustion engine, so as to close the intake valve at an intake valve closing timing for middle-load, the closing timing varying based on the load of the internal combustion and lagging the intake valve closing timing for light load, and so as to inject the fuel from the fuel injection means at an injection timing within an early stage and/or a middle stage of an intake stroke, at which a swirl of air taken into the combustion chamber is the strongest, the injection timing being between the intake valve opening timing for middle-load and the intake valve closing timing for middle-load, to thereby form the homogeneous air/fuel mixture; and the diffusion combustion operation execution means is configured so as to open the intake valve at an intake valve opening timing for high load, the opening timing varying based on the load of the internal combustion engine, so as to close the intake valve at an intake valve closing timing for high load, the closing timing varying based on the load of the internal combustion and leading the intake valve closing timing for middle-load, and so as to inject the fuel from the fuel injection means at an injection timing lagging the intake valve closing timing for high load and near a compression top-dead-center.

3. An internal combustion engine according to claim 2, wherein:

the piston has a cavity formed at a central portion of the top surface of the piston; and the fuel injection means is configured so as to inject the fuel toward the cavity;

the internal combustion engine further comprises stratified-charge auto-ignition combustion operation execution means for, when the internal combustion engine is operated in a very-light-load region in which load is smaller than in the light-load region, opening the intake valve at an intake valve opening timing for very light load, the opening timing varying based on the load of the internal combustion engine; closing the intake valve at an intake valve closing timing for very light load, the closing timing varying based on the load of the internal combustion engine; injecting the fuel from the fuel injection means at an injection timing within a middle stage of a compression stroke, the injection timing being after the intake valve closing timing for very light load and before the compression top-dead-center, to thereby substantially stagnate the injected fuel in the cavity, and forming and compressing the homogeneous air/fuel mixture within the cavity to thereby initiate auto-ignition combustion of the fuel.

4. An internal combustion engine according to claim 3, wherein:

the cavity has a closed-bottomed and generally cylindrical shape and is formed such that an edge portion serving as an inlet of the cavity has a diameter smaller than a maximum diameter of the interior of the cavity and such that a swirl guide groove for introducing the intake air swirl into the cavity is formed at an outer circumferential portion of the cavity.

5. An internal combustion engine according to claim 3, wherein:

the spark-generating means is a spark plug which is disposed such that a spark-generating portion thereof for generating the ignition spark is located at an inner circumferential portion of the cavity;

the internal combustion engine further comprises start/cold-time stratified-charge spark-ignition combustion operation execution means for, when the internal combustion engine is started and/or in a cold condition, opening the intake valve at a predetermined intake valve opening timing for start/cold time, closing the intake valve at a predetermined intake valve closing timing for start/cold time, injecting the fuel from the fuel injection means at an injection timing within a latter stage of a compression stroke, which injection timing lags the intake valve closing timing for start/cold time and is before the compression top-dead-center to thereby substantially stagnate the injected fuel in the cavity for forming a stratified air/fuel mixture within the cavity, and igniting the stratified air/fuel mixture by means of an ignition spark generated by the spark-generating means to thereby initiate spark-ignition combustion of the fuel.

6. An internal combustion engine according to claim 5, wherein:

the cavity has a closed-bottomed and generally cylindrical shape and is formed such that an edge portion serving as an inlet of the cavity has a diameter smaller than a maximum diameter of the interior of the cavity and such that a swirl guide groove for introducing the intake air swirl into the cavity is formed at an outer circumferential portion of the cavity, and the spark plug is disposed along the swirl guide groove.

7. An internal combustion engine according to claim 3, wherein:

a heat-insulating layer is formed on a wall surface of the cavity.

8. An internal combustion engine according to claim 3, further comprising a supercharger, wherein each of the stratified-charge auto-ignition combustion operation execution means, the premixed-charge compression auto-ignition combustion operation execution means, the spark-ignition combustion operation execution means, and the diffusion combustion operation execution means is configured so as to close an exhaust valve before the intake valve is opened, thereby generating a negative overlap period, which is a period ranging from a timing of closing of the exhaust valve to a timing of opening of the intake valve, and so as to control the timing of closing of the exhaust valve and the timing of opening of the intake valve in such a manner that, as load of the internal combustion engine increases, the negative overlap period shortens.

9. An internal combustion engine according to claim 3, wherein:

the fuel injection means is configured so as to inject the fuel in a first injection condition in which the fuel is injected at a narrow injection angle, or in a second injection condition in which the fuel is injected at the narrow injection angle and at a wide injection angle, which is greater than the narrow injection angle;

the stratified-charge auto-ignition combustion operation execution means is configured so as to inject the fuel in the first injection condition from the fuel injection means; and each of the premixed-charge compression auto-ignition combustion operation execution means, the spark-ignition combustion operation execution means, and the diffusion combustion operation execution means is configured so as to inject the fuel in the second injection condition from the fuel injection means.

10. An internal combustion engine according to claim 9, wherein:

the fuel injection means is a fuel injection valve having a group of narrow-angle injection holes which are opened for injection of the fuel when a needle of the fuel injection valve is in either condition of a low-lift condition and a high-lift condition, and a group of wide-angle injection holes which are opened for injection of the fuel only when the needle is in the high-lift condition;

the stratified-charge auto-ignition combustion operation execution means is configured so as to inject the fuel in the first injection condition by bringing the needle to the low-lift condition; and each of the premixed-charge compression auto-ignition combustion operation execution means, the spark-ignition combustion operation execution means, and the diffusion combustion operation execution means is configured so as to inject the fuel in the second injection condition by bringing the needle to the high-lift condition.

11. An internal combustion engine according to claim 10, wherein:

the fuel injection valve is formed such that the number of the wide-angle injection holes is greater than the number of the narrow-angle injection holes and such that the wide-angle injection holes are smaller in diameter than the narrow-angle injection holes;

the internal combustion engine further comprising fuel-injection-pressure-regulating means for increasing pressure of the fuel injected from the fuel injection valve with load of the internal combustion engine.

12. An internal combustion engine according to claim 2, further comprising:

cylinder pressure detection means for detecting cylinder pressure, which is pressure within the combustion chamber; and operation changeover means for, during the auto-ignition combustion operation is being executed by the premixed-charge compression auto-ignition combustion operation execution means, obtaining a cylinder pressure average by averaging cylinder pressures which are detected by the cylinder pressure detection means in a period ranging from start of a compression stroke to end of the combustion stroke associated with a single combustion, and obtaining an average cylinder-pressure-average by averaging cylinder pressure averages associated with a plurality of past combustions and for, when an absolute value of a difference between a cylinder pressure average associated with a current combustion and the average cylinder-pressure-average is greater than a predetermined value, changing over operation so as to execute the auto-ignition combustion operation by the stratified-charge auto-ignition combustion operation execution means.

13. An internal combustion engine according to claim 2, further comprising:

cylinder pressure detection means for detecting cylinder pressure, which is pressure within the combustion chamber; and operation changeover means for, during the auto-ignition combustion operation is being executed by the premixed-charge compression auto-ignition combustion operation execution means, obtaining a cylinder-pressure change rate, which is an amount of change in cylinder pressure per unit time or unit crank angle, on the basis of the detected cylinder pressure and for, when the obtained cylinder-pressure change rate is in excess of a predetermined change rate, changing over operation so as to execute the spark-ignition combustion operation by the spark-ignition combustion operation execution means.

14. An internal combustion engine according to claim 2, further comprising:

knocking detection means for detecting knocking; and operation changeover means for, during the spark-ignition combustion operation is being executed by the spark-ignition combustion operation execution means, obtaining a frequency of occurrence of knocking on the basis of the detected knocking and for, when the obtained frequency of occurrence of knocking is in excess of a predetermined frequency, changing over operation so as to execute the diffusion combustion operation by the diffusion combustion operation execution means.

15. An internal combustion engine according to claim 2, further comprising a supercharger, wherein each of the premixed-charge compression auto-ignition combustion operation execution means, the spark-ignition combustion operation execution means, and the diffusion combustion operation execution means is configured so as to close an exhaust valve before the intake valve is opened, thereby generating a negative overlap period, which is a period ranging from a timing of closing of the exhaust valve to a timing of opening of the intake valve, and so as to control the timing of closing of the exhaust valve and the timing of opening of the intake valve in such a manner that, as load of the internal combustion engine increases, the negative overlap period shortens.

16. An internal combustion engine according to claim 1, configured so as to perform a 2-cycle operation in which, every 360 degrees of crank angle, an exhaust stroke is started through establishment of communication between the combustion chamber and an exhaust port while communication is cut off between the combustion chamber and an intake port which is configured so as to generate an intake air swirl within the combustion chamber; next, a scavenging stroke is started through establishment of communication between the combustion chamber and the intake port; next, an intake stroke is started through cutoff of the communication between the combustion chamber and the exhaust port; next, a compression stroke is started through cutoff of the communication between the combustion chamber and the intake port; and subsequently, a combustion stroke is initiated;

the internal combustion engine further comprising stratified-charge auto-ignition combustion operation execution means for, when the internal combustion engine is operated in a very-light-load region in which load is smaller than in the light-load region, injecting the fuel from the fuel injection means at an injection timing within middle stage of the compression stroke to thereby substantially stagnate the injected fuel in the cavity, and forming and compressing a homogeneous air/fuel mixture within the cavity to thereby initiate auto-ignition combustion of the fuel;

wherein the premixed-charge compression auto-ignition combustion operation execution means is configured so as to inject the fuel from the fuel injection means at an injection timing when a swirl of air taken into the combustion chamber is the strongest during a period of time ranging from establishment of communication between the combustion chamber and the intake port to cutoff of the communication; and the diffusion combustion operation execution means is configured so as to inject the fuel from the fuel injection means at an injection timing near a top dead center during the compression stroke to thereby initiate diffusion combustion of the fuel and so as to cut off the communication between the combustion chamber and the intake port at a timing which leads a timing of cutting off the communication between the combustion chamber and the intake port which is determined to avoid excessive occurrence of knocking under the assumption that spark-ignition combustion is carried out in the high-load region in which the diffusion combustion operation is actually performed.

17. An internal combustion engine according to claim 1, configured so as to perform a 2-cycle operation in which, every 360 degrees of crank angle, an exhaust stroke is started through establishment of communication between the combustion chamber and an exhaust port while communication is cut off between the combustion chamber and an intake port which is configured so as to generate an intake air swirl within the combustion chamber; next, a scavenging stroke is started through establishment of communication between the combustion chamber and the intake port; next, a compression stroke is started through cutoff of the communication between the combustion chamber and the exhaust port and cutoff of the communication between the combustion chamber and the intake port; and subsequently, a combustion stroke is initiated;

the internal combustion engine further comprising stratified-charge auto-ignition combustion operation execution means for, when the internal combustion engine is operated in a very-light-load region in which load is smaller than in the light-load region, injecting the fuel from the fuel injection means at an injection timing for very light load during a middle stage of the compression stroke to thereby substantially stagnate the injected fuel in the cavity, and compressing the homogeneous air/fuel mixture being formed within the cavity to thereby initiate auto-ignition combustion of the fuel; and a supercharger for compressing air which flows into the combustion chamber through the intake port;

wherein the piston has a cavity formed at a central portion of the top surface of the piston;

the fuel injection means is a fuel injection valve disposed at a lower surface of the cylinder head and at a substantially central portion of the bore of the cylinder and adapted to inject the fuel toward the cavity;

the exhaust port is configured such that one end of the exhaust port forms an opening portion at the lower surface of the cylinder head and around the fuel injection valve, such that opening the opening portion by an exhaust valve disposed at the opening portion establishes communication between the exhaust port and the combustion chamber, and such that closing the opening portion by the exhaust valve cuts off the communication between the exhaust port and the combustion chamber;

the intake port is configured such that one end of the intake port forms an opening portion at a bore wall surface of the cylinder, such that opening the opening portion by a side wall of the piston during movement of the piston from a top dead center to a bottom dead center establishes communication between the intake port and the combustion chamber, and such that closing the opening portion by the side wall of the piston during movement of the piston from the bottom dead center to the top dead center cuts off the communication between the intake port and the combustion chamber;

the premixed-charge compression auto-ignition combustion operation execution means is configured so as to inject the fuel at an injection timing for light load in advance of the injection timing for very light load to thereby form the homogeneous air/fuel mixture; and the diffusion combustion operation execution means is configured so as to inject the fuel from the fuel injection means at an injection timing for high load during the compression stroke, which injection timing for high load lags the injection timing for very light load and is near the top dead center, to thereby initiate diffusion combustion of the fuel.

* * * * *